US012626429B2

(12) United States Patent
Wang et al.

(10) Patent No.: US 12,626,429 B2
(45) Date of Patent: May 12, 2026

(54) JOINT FRAMEWORK FOR OBJECT-CENTERED SHADOW DETECTION, REMOVAL, AND SYNTHESIS

(71) Applicant: Adobe Inc., San Jose, CA (US)

(72) Inventors: Tianyu Wang, Hong Kong (CN); Soo Ye Kim, Daejeon (KR); Luis Figueroa, San Jose, CA (US); Haitian Zheng, Rochester, NY (US); Jianming Zhang, Campbell, CA (US); Zhihong Ding, Fremont, CA (US); Scott Cohen, Sunnyvale, CA (US); Zhe Lin, Fremont, CA (US); Wei Xiong, San Jose, CA (US)

(73) Assignee: Adobe Inc., San Jose, CA (US)

( * ) Notice: Subject to any disclaimer, the term of this patent is extended or adjusted under 35 U.S.C. 154(b) by 114 days.

(21) Appl. No.: 18/651,376

(22) Filed: Apr. 30, 2024

(65) Prior Publication Data

US 2025/0336119 A1 Oct. 30, 2025

(51) Int. Cl.
| | |
|---|---|
| *G06T 11/40* | (2006.01) |
| *G06T 5/60* | (2024.01) |
| *G06T 5/77* | (2024.01) |

(52) U.S. Cl.
CPC .............. *G06T 11/40* (2013.01); *G06T 5/60* (2024.01); *G06T 5/77* (2024.01); *G06T 2200/24* (2013.01); *G06T 2207/20084* (2013.01)

(58) Field of Classification Search
CPC ... G06T 11/40; G06T 5/60; G06T 5/77; G06T 2200/24; G06T 2207/20084
See application file for complete search history.

(56) References Cited

U.S. PATENT DOCUMENTS

| | | | |
|---|---|---|---|
| 9,430,715 B1 | 8/2016 | Wang et al. | |
| 2023/0143816 A1* | 5/2023 | Zhang | G06T 15/205 |
| | | | 345/426 |
| 2025/0131572 A1* | 4/2025 | Rim | G06T 7/0002 |

OTHER PUBLICATIONS

Alec Radford, Jong Wook Kim, Chris Hallacy, Aditya Ramesh, Gabriel Goh, Sandhini Agarwal, Girish Sastry, Amanda Askell, Pamela Mishkin, Jack Clark, et al. "Learning Transferable Visual Models From Natural Language Supervision". In International Conference on Machine Learning, 16 pages, Feb. 2021.
(Continued)

*Primary Examiner* — Chong Wu
(74) *Attorney, Agent, or Firm* — Keller Preece PLLC

(57) ABSTRACT

The present disclosure relates to systems, methods, and non-transitory computer-readable media that detects shadows, removes shadows, and synthesizes shadows in a joint-framework. In particular, the disclosed systems access an object mask of an object and a digital image depicting the object and a shadow of the object. Furthermore, the disclosed systems perform object-centered shadow detection and removal to generate a modified digital image without the shadow by utilizing a shadow analyzer model. Moreover, the disclosed systems receive a user interaction to manipulate an object and generate a modified shadow utilizing a shadow synthesis model where the shadow synthesis model is conditioned on a shadow mask generated by the shadow analyzer model.

20 Claims, 22 Drawing Sheets

(56)                    References Cited

OTHER PUBLICATIONS

Alex Nichol, Prafulla Dhariwal, Aditya Ramesh, Pranav Shyam, Pamela Mishkin, Bob McGrew, Ilya Sutskever, and Mark Chen. GLIDE: Towards Photorealistic Image Generation and Editing with Text-Guided Diffusion Models. 20 pages, arXiv preprint arXiv:2112.10741v2, Dec. 22, 2021.

Bahjat Kawar, Shiran Zada, Oran Lang, Omer Tov, Huiwen Chang, Tali Dekel, Inbar Mosseri, and Michal Irani. Imagic: Text Based Real Image Editing with Diffusion Models. In IEEE/CVF Conference on Computer Vision and Pattern Recognition (CVPR), pp. 6007-6607, Jun. 2023.

Bin Ding, Chengjiang Long, Ling Zhang, and Chunxia Xiao. "ARGAN: Attentive Recurrent Generative Adversarial Network for Shadow Detection and Removal". In IEEE International Conference on Computer Vision (ICCV), pp. 10213-10222, Oct. 2019.

Binxin Yang, Shuyang Gu, Bo Zhang, Ting Zhang, Xuejin Chen, Xiaoyan Sun, Dong Chen, and Fang Wen. "Paint by Example: Exemplar-based Image Editing with Diffusion Models". In IEEE/CVF Conference on Computer Vision and Pattern Recognition (CVPR), pp. 18381-18391, Jun. 2023.

Blender Foundation. Blender. Webpage <https://www.blender.org>, 5 pages,Nov. 29, 2023, retrieved from the Internet Wayback Machine <https://web.archive.org/web/20231125114037/https://www.blender.org/ on Jun. 10, 2024.

Colin Raffel, Noam Shazeer, Adam Roberts, Katherine Lee, Sharan Narang, Michael Matena, Yanqi Zhou, Wei Li, and Peter J. Liu. "Exploring the Limits of Transfer Learning with a Unified Text-to-Text Transformer". Journal of Machine Learning Research, 67 pages, Jan. 2020.

Daquan Liu, Chengjiang Long, Hongpan Zhang, Hanning Yu, Xinzhi Dong, and Chunxia Xiao. "ARShadowGAN: Shadow Generative Adversarial Network for Augmented Reality in Single Light Scenes". In IEEE/CVF Conference on Computer Vision and Pattern Recognition (CVPR), pp. 8139-8148, Jun. 2020.

Edward Zhang, Ricardo Martin-Brualla, Janne Kontkanen, and Brian L. Curless. "No Shadow Left Behind: Removing Objects and their Shadows using Approximate Lighting and Geometry". In IEEE/CVF Conference on Computer Vision and Pattern Recognition (CVPR), pp. 16397-16406, Jun. 2021.

Fausto Milletari, Nassir Navab, and Seyed-Ahmad Ahmadi. V-Net: Fully Convolutional Neural Networks for Volumetric Medical Image Segmentation. In International Conference on 3D Vision (3DV), pp. 565-571, Dec. 2016.

Google. Magic Eraser. Webpage <https://blog.google/products/photos/magic-eraser-android-ios-google-one/>, 3 pages, Dec. 12, 2023, retrieved from the Internet Wayback Machine <https://web.archive.org/web/20231212053955/https://blog.google/products/photos/magic-eraser-android-ios-google-one/> on Aug. 22, 2024.

Haitian Zheng, Zhe Lin, Jingwan Lu, Scott Cohen, Eli Shechtman, Connelly Barnes, Jianming Zhang, Ning Xu, Sohrab Amirghodsi, and Jiebo Luo. CM-GAN: Image Inpainting with Cascaded Modulation GAN and Object-Aware Training. In European Conference on Computer Vision (ECCV), 18 pages, 2022. Webpage <https://www.ecva.net/papers/eccv_2022/papers_ECCV/papers/136760263.pdf>.

Han Yang, Tianyu Wang, Xiaowei Hu, and Chi-Wing Fu. "SILT: Shadow-aware Iterative Label Tuning for Learning to Detect Shadows from Noisy Labels". In IEEE International Conference on Computer Vision (ICCV), pp. 12687-12698, Oct. 1, 2023.

Hieu Le and Dimitris Samaras. "Shadow Removal via Shadow Image Decomposition". In IEEE International Conference on Computer Vision (ICCV), pp. 8578-8587, Aug. 2019.

Hieu Le, Tomas F. Yago Vicente, Vu Nguyen, Minh Hoai, and Dimitris Samaras. "A+D Net: Training a Shadow Detector with Adversarial Shadow Attenuation". In European Conference on Computer Vision (ECCV), 17 pages, Sep. 2018.

Jiawei Liu, Qiang Wang, Huijie Fan, Wentao Li, Liangqiong Qu, and Yandong Tang. "A Decoupled Multi-Task network for Shadow Removal". IEEE Transactions on Multimedia, (25), 15 pages, Mar. 2023.

Jifeng Wang, Xiang Li, and Jian Yang. "Stacked Conditional Generative Adversarial Networks for Jointly Learning Shadow Detection and Shadow Removal". In IEEE/CVF Conference on Computer Vision and Pattern Recognition (CVPR), pp. 1788-1797, Jun. 2018.

Jin Wan, Hui Yin, Zhenyao Wu, Xinyi Wu, Yanting Liu, and Song Wang. Style-Guided Shadow Removal. In European Conference on Computer Vision (ECCV), 17 pages, Nov. 2022.

Kai Zhou, Wen Wu, Yan-Li Shao, Jing-Long Fang, Xing- Qi Wang, and Dan Wei. "Shadow Detection via Multi-Scale Feature Fusion and Unsupervised Domain Adaptation". Journal of Visual Communication and Image Representation, 88: 103596, 10 pages, Oct. 2022.

Lanqing Guo, Chong Wang, Wenhan Yang, Siyu Huang, Yufei Wang, Hanspeter Pfister, and Bihan Wen. ShadowDiffusion: When Degradation Prior Meets Diffusion Model for Shadow Removal. In IEEE/CVF Conference on Computer Vision and Pattern Recognition (CVPR), pp. 14049-14058, Jun. 17, 2023.

Lanqing Guo, Siyu Huang, Ding Liu, Hao Cheng, and Bihan Wen. "ShadowFormer: Global Context Helps Image Shadow Removal". In AAAI Conference on Artificial Intelligence, 79;710-718, Feb. 3, 2023.

Lei Zhu, Ke Xu, Zhanghan Ke, and Rynson W.H. Lau. "Mitigating Intensity Bias in Shadow Detection via Feature Decomposition and Reweighting". In IEEE International Conference on Computer Vision (ICCV), pp. 4702-4711, Oct. 2021.

Lei Zhu, Zijun Deng, Xiaowei Hu, Chi-Wing Fu, Xuemiao Xu, Jing Qin, and Pheng-Ann Heng. "Bidirectional Feature Pyramid Network with Recurrent Attention Residual Modules for Shadow Detection". In European Conference on Computer Vision (ECCV), 16 pages, Oct. 2018.

Leiping Jie and Hui Zhang. "RMLANet: Random Multi-Level Attention Network for Shadow Detection". In IEEE International Conference on Multimedia and Expo, pp. 1-6, Jul. 2022.

Li Shen, TeckWee Chua, and Karianto Leman. "Shadow Optimization from Structured Deep Edge Detection". In IEEE/CVF Conference on Computer Vision and Pattern Recognition (CVPR), pp. 2067-2074, Jun. 2015.

Liangqiong Qu, Jiandong Tian, Shengfeng He, Yandong Tang, and RynsonW.H. Lau. "DeshadowNet: A Multi-context Embedding Deep Network for Shadow Removal". In IEEE/CVF Conference on Computer Vision and Pattern Recognition (CVPR), pp. 4067-4075, Jul. 2017.

Mehmet Kerim Yucel, Valia Dimaridou, Bruno Manganelli, Mete Ozay, Anastasios Drosou, and Albert Saa-Garriga. "LRA & LDRA: Rethinking Residual Predictions for Efficient Shadow Detection and Removal". In IEEE/CVF Winter Conference on Applications of Computer Vision (WACV), pp. 4925-4935, Jan. 2023.

Minguk Kang, Jun-Yan Zhu, Richard Zhang, Jaesik Park, Eli Shechtman, Sylvain Paris, and Taesung Park. "Scaling up GANs for Text-to-Image Synthesis". In IEEE/CVF Conference on Computer Vision and Pattern Recognition (CVPR), pp. 10124-10134, Mar. 2023.

Mrinmoy Sen, Sai Pradyumna Chermala, Nazrinbanu Nurmohammad Nagori, Venkat Peddigari, Praful Mathur, B. H. Pawan Prasad, and Moonhwan Jeong. "SHARDS: Efficient SHAdow Removal using Dual Stage Network for High Resolution Images". In IEEE/CVF Winter Conference on Applications of Computer Vision (WACV), pp. 1809-1817, Jan. 2023.

Quanlong Zheng, Xiaotian Qiao, Ying Cao, and Rynson W.H. Lau. "Distraction-aware Shadow Detection". In IEEE/CVF Conference on Computer Vision and Pattern Recognition (CVPR), pp. 5167-5176, Jun. 2019.

Robin Rombach, Andreas Blattmann, Dominik Lorenz, Patrick Esser, and Björn Ommer. "High-Resolution Image Synthesis with Latent Diffusion Models". In IEEE/CVF Conference on Computer Vision and Pattern Recognition (CVPR), pp. 10684-10695, 2022.

Salman Hameed Khan, Mohammed Bennamoun, Ferdous Sohel, and Roberto Togneri. "Automatic Feature Learning for Robust Shadow Detection". In IEEE/CVF Conference on Computer Vision and Pattern Recognition (CVPR), pp. 1939-1946, Jun. 2014.

Shaoan Xie, Zhifei Zhang, Zhe Lin, Tobias Hinz, and Kun Zhang. "SmartBrush: Text and Shape Guided Object Inpainting with Dif-

(56) References Cited

OTHER PUBLICATIONS fusion Model". In IEEE/CVF Conference on Computer Vision and Pattern Recognition (CVPR), pp. 22428-22437, Jun. 2023.

Shuyang Zhang, Runze Liang, and Miao Wang. "ShadowGAN: Shadow Synthesis for Virtual Objects with Conditional Adversarial Networks". Computational Visual Media (CVM), 11 pages, Mar. 2019.

Tianyu Wang, Xiaowei Hu, Chi-Wing Fu, and Pheng-Ann Heng. "Single-Stage Instance Shadow Detection with Bidirectional Relation Learning". In IEEE/CVF Conference on Computer Vision and Pattern Recognition (CVPR), pp. 1-11, Jun. 2021.

Tianyu Wang, Xiaowei Hu, Wiong Wang. Pheng-Ann Heng, and Chi-Wing Fu. "Instance Shadow Detection with A Single-Stage Detector". IEEE Transactions on Pattern Analysis and Machine Intelligence, pp. 1-14, arXiv preprint arXiv:2207.04614v1, Jul. 11, 2022.

Tianyu Wang, Xiaowei Hu, Qiong Wang, Pheng-Ann Heng, and Chi-Wing Fu. Instance shadow detection. IEEE/CVF Conference on Computer Vision and Pattern Recognition, pp. 1877-1886, Jun. 2020.

Tianyu Wang, Xiaowei Hu, Qiong Wang, Pheng-Ann Heng, and Chi-Wing Fu. "Instance Shadow Detection". In IEEE/CVF Conference on Computer Vision and Pattern Recognition (CVPR), pp. 1880-1889, Jun. 2020.

Tomas F. Yago Vicente, Le Hou, Chen-Ping Yu, Minh Hoai, and Dimitris Samaras. "Large-Scale Training of Shadow Detectors with Noisily-Annotated Shadow Examples". In European Conference on Computer Vision (ECCV), pp. 816-832, Oct. 2016.

Tsung-Yi Lin, Michael Maire, Serge J. Belongie, Lubomir D. Bourdev, Ross B. Girshick, James Hays, Pietro Perona, Deva Ramanan, Piotr Dollar, and C. Lawrence Zitnick. "Microsoft COCO: Common Objects in Context". CoRR, abs/1405.0312, pp. 740-755, May 2014.

Vu Nguyen, Tomas F. Yago Vicente, Maozheng Zhao, Minh Hoai, and Dimitris Samaras. "Shadow Detection with Conditional Generative Adversarial Networks". In IEEE International Conference on Computer Vision (ICCV), pp. 4510-4518, Oct. 2017.

Wen Wu, Kai Zhou, Xiao-Diao Chen, and Jun-Hai Yong. "Light-Weight Shadow Detection via GCN-Based Annotation Strategy and Knowledge Distillation". Computer Vision and Image Understanding, 216:103341, 12 pages, Feb. 2022.

Xi Chen, Lianghua Huang, Yu Liu, Yujun Shen, Deli Zhao, and Hengshuang Zhao. "AnyDoor: Zero-shot Object-level Image Customization". 11 pages, arXiv preprint arXiv:2307.09481v1, Jul. 18, 2023.

Xianyong Fang, Xiaohao He, Linbo Wang, and Jianbing Shen. "Robust Shadow Detection by Exploring Effective Shadow Contexts". In Proceedings of the 29th ACM International Conference on Multimedia, pp. 2927-2935, Oct. 20, 2021.

Xiaodong Cun, Chi-Man Pun, and Cheng Shi. "Towards Ghost-Free Shadow Removal via Dual Hierarchical Aggregation Network and Shadow Matting GAN". In AAAI Conference on Artificial Intelligence, 34(07):10680-10687, Apr. 2020.

Xiaowei Hu, Chi-Wing Fu, Lei Zhu, Jing Qin, and Pheng-Ann Heng. "Direction-aware Spatial Context Features for Shadow Detection and Removal". IEEE Transactions on Pattern Analysis and Machine Intelligence, 14 pages, arXiv preprint arXiv:1805. 04635v2, May 25, 2019.

Xiaowei Hu, Lei Zhu, Chi-Wing Fu, Jing Qin, and Pheng- Ann Heng. "Direction-aware Spatial Context Features for Shadow Detection". In IEEE/CVF Conference on Computer Vision and Pattern Recognition (CPVR), pp. 7454-7462, Jun. 18, 2018.

Xiaowei Hu, Tianyu Wang, Chi-Wing Fu, Yitong Jiang, Qiong Wang, and Pheng-Ann Heng. "Revisiting Shadow Detection: A New Benchmark Dataset for Complex World". IEEE Transactions on Image Processing, 10 pages, arXiv preprint arXiv:1911.06998v3, Jan. 2, 2021.

Xiaowei Hu, Yitong Jiang, Chi-Wing Fu, and Pheng-Ann Heng. "Mask-ShadowGAN: Learning to Remove Shadows from Unpaired Data". In IEEE International Conference on Computer Vision (ICCV), pp. 2472-2481, Oct. 2019.

Yan Hong, Li Niu, and Jianfu Zhang. "Shadow Generation for Composite Image in Real-World Scenes". In AAAI Conference on Artificial Intelligence, pp. 914-922, 2022.

Yeying Jin, Aashish Sharma, and Robby T. Tan. "DC-shadownet: Single-Image Hard and Soft Shadow Removal Using Unsupervised Domain-Classifier Guided Network". In IEEE International Conference on Computer Vision (ICCV), pp. 5027-5036, Oct. 2021.

Yichen Sheng, Jianming Zhang, and Bedrich Benes. "SSN: Soft Shadow Network for Image Compositing". In IEEE/CVF Conference on Computer Vision and Pattern Recognition (CVPR), pp. 4380-4390, Jun. 2021.

Yichen Sheng, Jianming Zhang, Julien Philip, Yannick Hold Geoffroy, Xin Sun, He Zhang, Lu Ling, and Bedrich Benes. "PixHt-Lab: Pixel Height Based Light Effect Generation for Image Compositing". In IEEE/CVF Conference on Computer Vision and Pattern Recognition (CVPR), pp. 16643-16653, Jun. 2023.

Yichen Sheng, Yifan Liu, Jianming Zhang, Wei Yin, A. Cengiz Oztireli, He Zhang, Zhe Lin, Eli Shechtman, and Bedrich Benes. "Controllable Shadow Generation Using Pixel Height Maps". In European Conference on Computer Vision (ECCV), 17 pages, Oct. 2022.

Yizhi Song, Zhifei Zhang, Zhe Lin, Scott Cohen, Brian Price, Jianming Zhang, Soo Ye Kim, and Daniel Aliaga. "ObjectStitch: Object Compositing with Diffusion Model". In IEEE/CVF Conference on Computer Vision and Pattern Recognition (CVPR), pp. 18310-18319, Jun. 2023.

Yogesh Balaji, Seungjun Nah, Xun Huang, Arash Vahdat, Jiaming Song, Qinsheng Zhang, Karsten Kreis, Miika Aittala, Timo Aila, Samuli Laine, Bryan Catanzaro, Tero Karras, and Ming-Yu Liu. "eDiff-I: Text-to-image diffusion models with ensemble of expert denoisers". 24 pages, arXiv preprint arXiv:2211.01324v4, Nov. 17, 2022.

Yuheng Li, Haotian Liu, Qingyang Wu, Fangzhou Mu, Jianwei Yang, Jianfeng Gao, Chunyuan Li, and Yong Jae Lee. "GLIGEN: Open-Set Grounded Text-to-Image Generation". IEEE/CVF Conference on Computer Vision and Pattern Recognition (CVPR), pp. 22511-22521, Jun. 2023.

Yurui Zhu, Jie Huang, Xueyang Fu, Feng Zhao, Qibin Sun, and Zheng-Jun Zha. "Bijective Mapping Network for Shadow Removal". In IEEE/CVF Conference on Computer Vision and Pattern Recognition (CVPR), pp. 5627-5636, Jun. 2022.

Yurui Zhu, Xueyang Fu, Chengzhi Cao, XiWang, Qibin Sun, and Zheng-Jun Zha. "Single Image Shadow Detection via Complementary Mechanism". In Proceedings of the 30th ACM International Conference on Multimedia, pp. 6717-6726, Oct. 2022.

Yurui Zhu, Zeyu Xiao, Yanchi Fang, Xueyang Fu, Zhiwei Xiong, and Zheng-Jun Zha. "Efficient Model-Driven Network for Shadow Removal". In AAAI Conference on Artificial Intelligence, pp. 3635-3643, Jun. 2022.

Zhihao Chen, Lei Zhu, Liang Wan, Song Wang, Wei Feng, and Pheng-Ann Heng. "A Multi-task Mean Teacher for Semi-supervised Shadow Detection". In IEEE/CVF Conference on Computer Vision and Pattern Recognition (CVPR), pp. 5611-5620, Aug. 5, 2020.

Zhihao Liu, Hui Yin, Xinyi Wu, Zhenyao Wu, Yang Mi, and Song Wang. "From Shadow Generation to Shadow Removal". In IEEE/CVF Conference on Computer Vision and Pattern Recognition (CVPR), pp. 4927-4936, Jun. 2021.

Zipei Chen, Chengjiang Long, Ling Zhang, and Chunxia Xiao. "CANet: A Context-Aware Network for Shadow Removal". In IEEE International Conference on Computer Vision (ICCV), pp. 4743-4752, Oct. 2021.

Ziwei Luo, Fredrik K. Gustafsson, Zheng Zhao, Jens Sjölund, and Thomas B. Schön. "Controlling Vision-Language Models for Universal Image Restoration". 19 pages, arXiv preprint arXiv:2310. 01018v1, Oct. 2, 2023.

* cited by examiner

| Method | Global RMSE↓ | Bbox PSNR↑ | Bbox SSIM↑ |
|---|---|---|---|
| Ours with empty shadow mask | 2.88 | 25.22 | 80.79 |
| Ours with shadow mask | 2.81 | 25.66 | 82.39 |

*Fig. 9*

| Methods | mIoU | $mIoU_{xs}$ | $mIoU_s$ | $mIoU_m$ | $mIoU_l$ |
|---|---|---|---|---|---|
| SSIS [48] | 58.0 | 37.2 | 46.0 | 66.7 | 81.4 |
| SSISv2 [49] | 61.6 | 42.4 | 49.5 | 70.4 | 82.5 |
| Ours | 68.2 | 48.0 | 62.8 | 74.8 | 87.3 |

*Fig. 10*

| Method | Masked MAE ↓ | Masked RMSE ↓ | Bbox PSNR ↑ | Bbox SSIM ↑ | PSNR ↑ |
|---|---|---|---|---|---|
| ShadowDiffusion [11] with GT shadow mask | 60.71 | 17.50 | 19.42 | 54.70 | 25.04 |
| ShadowDiffusion† [11] with SSISv2 [49] detected shadow mask | 39.53 | 12.49 | 23.41 | 68.04 | 39.13 |
| ShadowDiffusion† [11] with GT shadow mask | 35.29 | 11.49 | 24.28 | 70.17 | 40.04 |
| Ours | 1.23 | 1.22 | 32.97 | 96.49 | 42.20 |

*Fig. 11*

|  | Method | Global RMSE↓ | Local RMSE↓ | Bbox PSNR↑ | Bbox SSIM↑ |
|---|---|---|---|---|---|
| DESOBA | SGRNet [12] | 4.63 | 51.71 | 22.25 | 70.38 |
|  | Ours | 2.88 | 31.55 | 25.22 | 80.79 |
| Video DESOBA | SGRNet [12] | 2.56 | 17.14 | 18.52 | 58.93 |
|  | Ours | 2.26 | 11.51 | 19.87 | 64.18 |

*Fig. 12*

| Method | Global RMSE↓ | Bbox PSNR↑ | Bbox SSIM↑ |
|---|---|---|---|
| Baseline 1: SSDM | 3.20 | 24.10 | 77.71 |
| Baseline 2: CLIP Embeddings | 4.51 | 25.01 | 80.53 |
| Ours | 2.88 | 25.22 | 80.79 |

*Fig. 13*

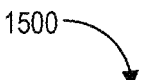
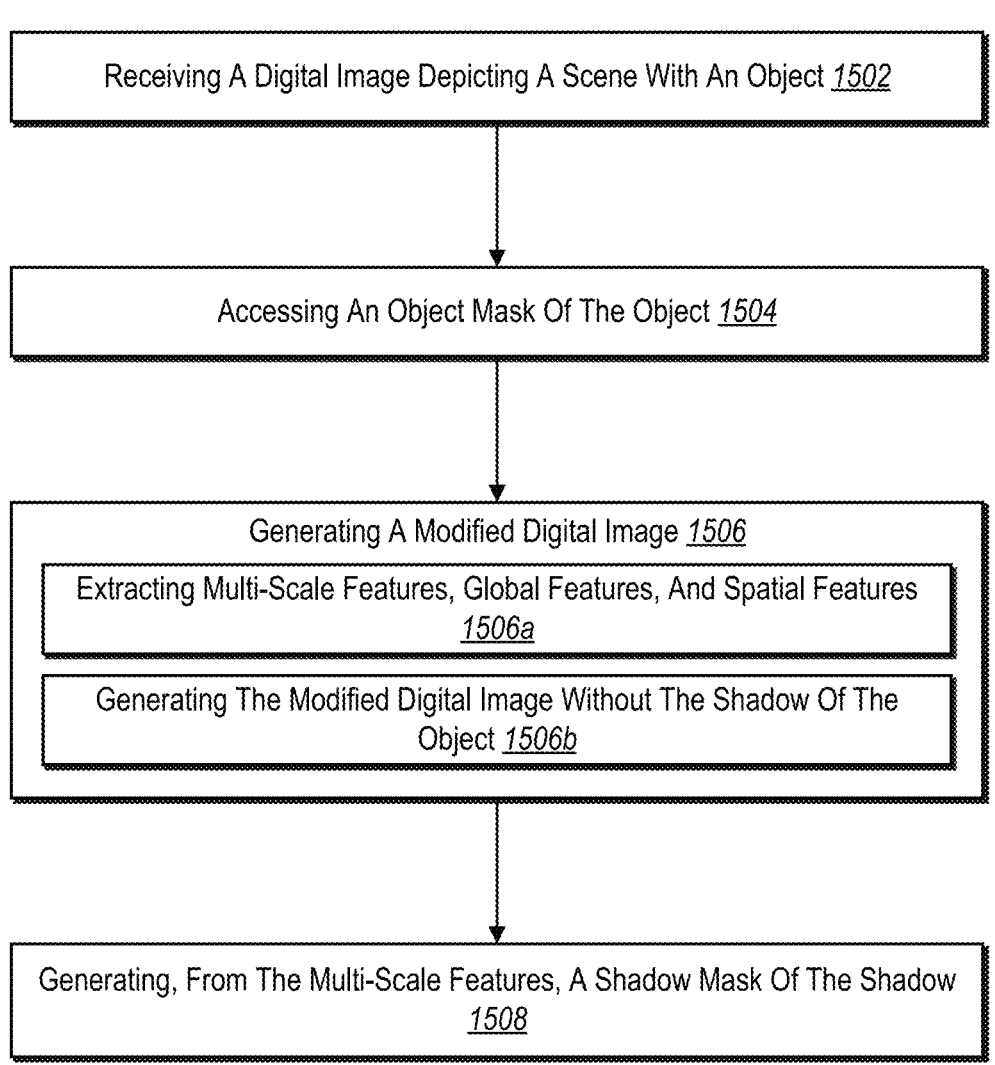
*Fig. 15*

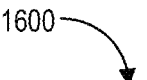

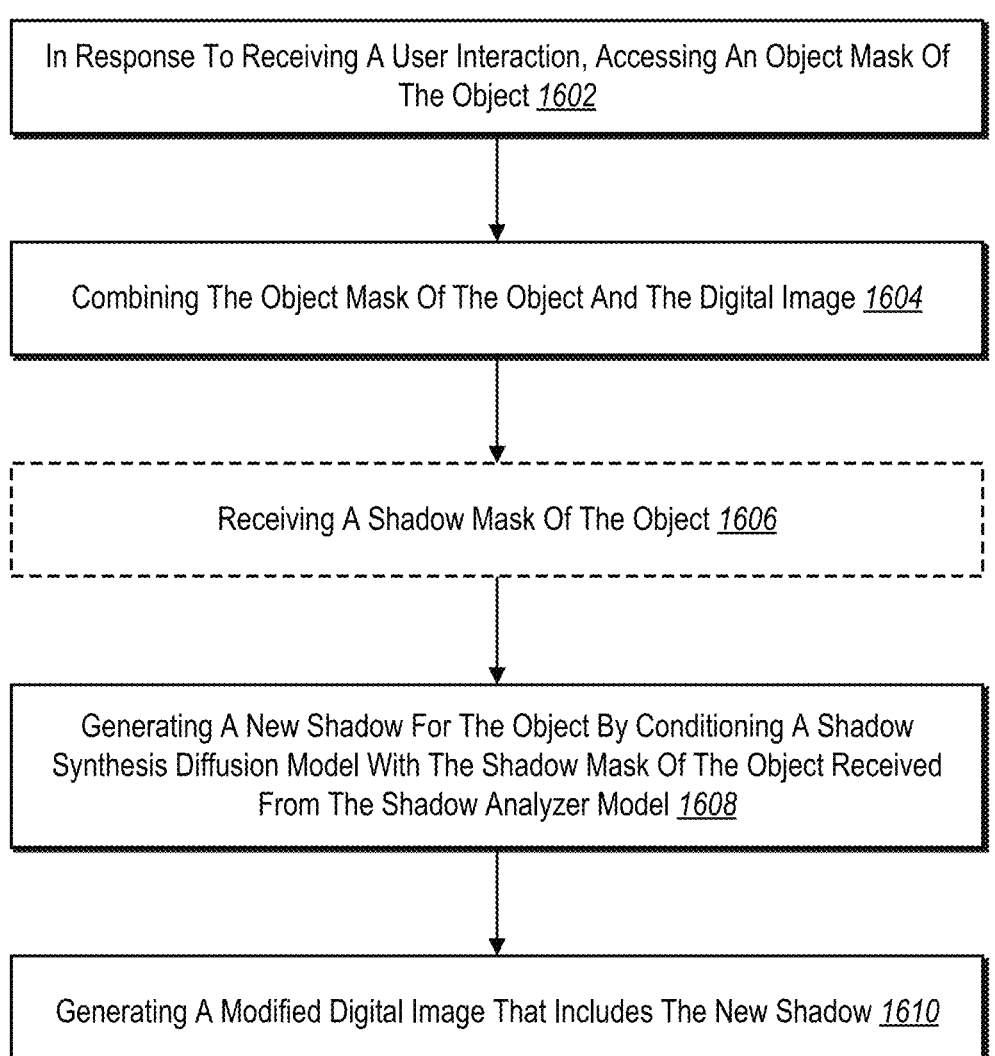

In Response To Receiving A User Interaction, Accessing An Object Mask Of The Object _1602_

Combining The Object Mask Of The Object And The Digital Image _1604_

Receiving A Shadow Mask Of The Object _1606_

Generating A New Shadow For The Object By Conditioning A Shadow Synthesis Diffusion Model With The Shadow Mask Of The Object Received From The Shadow Analyzer Model _1608_

Generating A Modified Digital Image That Includes The New Shadow _1610_

*Fig. 16*

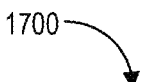

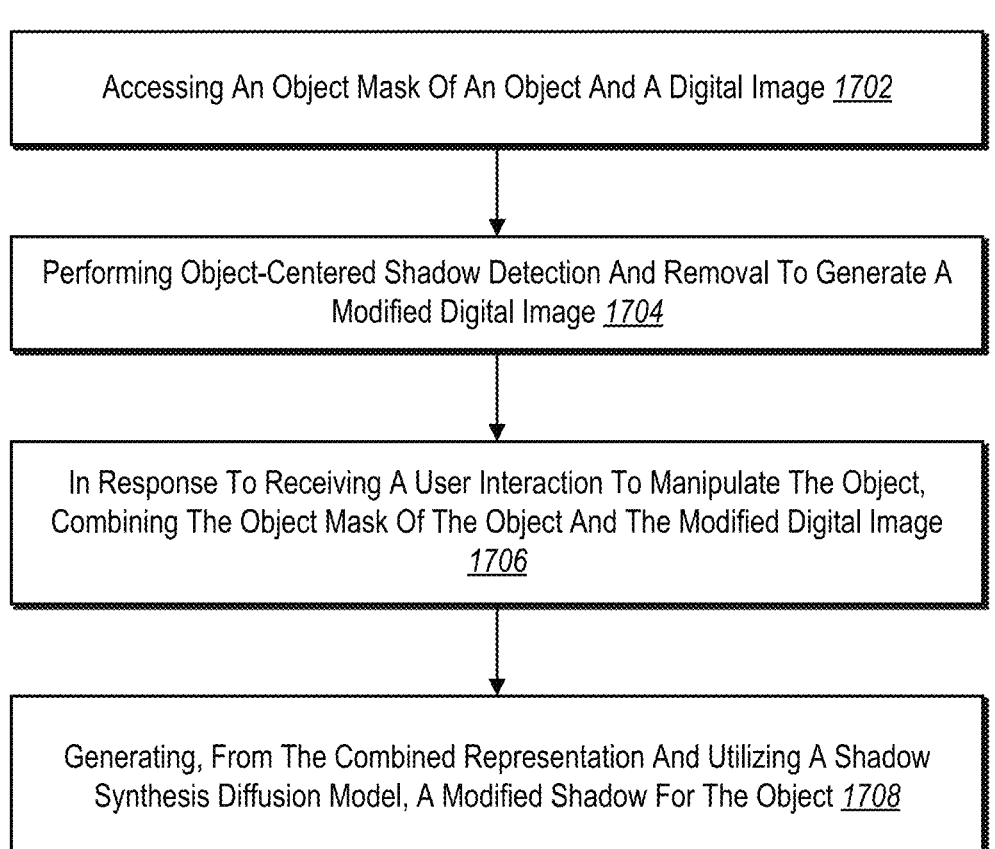

Accessing An Object Mask Of An Object And A Digital Image *1702*

Performing Object-Centered Shadow Detection And Removal To Generate A Modified Digital Image *1704*

In Response To Receiving A User Interaction To Manipulate The Object, Combining The Object Mask Of The Object And The Modified Digital Image *1706*

Generating, From The Combined Representation And Utilizing A Shadow Synthesis Diffusion Model, A Modified Shadow For The Object *1708*

*Fig. 17*

JOINT FRAMEWORK FOR OBJECT-CENTERED SHADOW DETECTION, REMOVAL, AND SYNTHESIS

BACKGROUND

Recent years have seen significant advancement in hardware and software platforms for performing computer vision and image editing tasks. Indeed, systems provide a variety of image-related tasks, such as object identification, classification, segmentation, composition, style transfer, image inpainting, etc. For instance, systems provide image editing tools for creating shadows in an image, as shadows play a vital role in enhancing the realism of an image. Despite the advances in shadow-oriented tasks in digital image editing, systems suffer from a number of deficiencies with regards to efficiency, accuracy, and operational flexibility.

SUMMARY

One or more embodiments described herein provide benefits and/or solve one or more problems in the art with systems, methods, and non-transitory computer-readable media that implement a meta-shadow system to facilitate flexible and efficient scene-based image editing. To illustrate, in one or more embodiments, a disclosed system utilizes a joint framework for object-centered shadow detection, removal, and synthesis. Specifically, the disclosed system contains a framework with a GAN-based shadow detection and removal model and a diffusion-based shadow synthesis pipeline that leverages features from the GAN-based shadow detection and removal model. For example, given a digital image and an object mask, the disclosed system simultaneously detects and removes a shadow cast by an associated object and leverages intermediate removal features as a reference for synthesizing a shadow when relocating the associated object (e.g., moving the object to another digital image or moving the object within the digital image).

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 9 illustrates experimental results of the meta-shadow system synthesizing a shadow based on an empty shadow mask and with a shadow mask prediction in accordance with one or more embodiments;

FIG. 10 illustrates experimental results of the meta-shadow system detecting shadows compared to prior systems in accordance with one or more embodiments;

FIG. 11 illustrates experimental results of the meta-shadow system synthesizing shadows compared to prior systems in accordance with one or more embodiments;

FIG. 12 illustrates experimental results of the meta-shadow system synthesizing shadows for an image dataset and a video dataset compared to prior systems in accordance with one or more embodiments;

FIG. 13 illustrates experimental ablation results of the meta-shadow system synthesizing shadows utilizing intermediate features from the shadow analyzer model in accordance with one or more embodiments;

FIG. 15 illustrates a flowchart of a series of acts for generating a shadow mask in accordance with one or more embodiments;

FIG. 16 illustrates a flowchart of a series of acts for generating a modified digital image that includes a new shadow in accordance with one or more embodiments;

FIG. 17 illustrates a flowchart of a series of acts for generating a modified shadow for an object in accordance with one or more embodiments;

DETAILED DESCRIPTION

Figure 1:
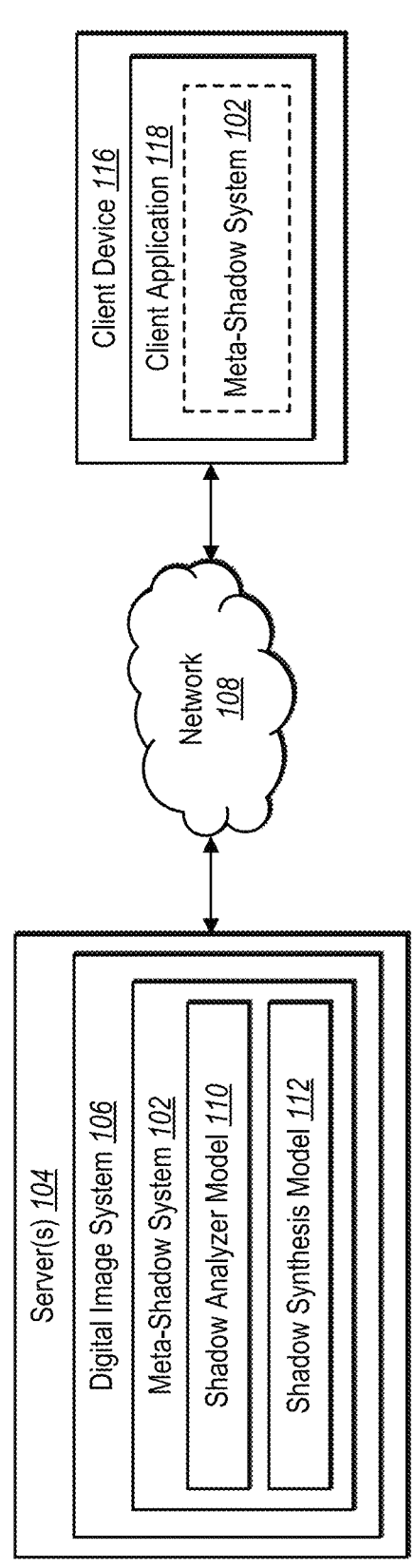
FIG. 1 illustrates an example environment in which a meta-shadow system operates in accordance with one or more embodiments.

One or more embodiments described herein include a meta-shadow system that implements an all-in-one versatile framework that enables shadow detection, removal, and controllable synthesis of shadows in digital images (e.g., in an object-centered fashion). Specifically, the meta-shadow system combines a shadow analyzer model for object-centered shadow detection removal, and a shadow synthesis model (e.g., a reference-based diffusion model) for shadow synthesis. For example, the meta-shadow system leverages intermediate features from the shadow analyzer model (e.g., shadow knowledge transfer) to guide the shadow synthesis model such that the synthesized shadows blend seamlessly with the scene of a digital image. In other words, the meta-shadow system generates a new shadow for an object that is locally and globally consistent with a scene of the digital image. For instance, in response to object relocation (e.g., removing from a digital image, moving within a digital image, and inserting within another digital image), the meta-shadow system efficiently and accurately synthesizes new shadows.

As mentioned, the meta-shadow system utilizes a shadow analyzer model for the detection and removal of shadows. Specifically, in some embodiments, just given the object mask, the meta-shadow system utilizes the shadow analyzer model that estimates a shadow mask and performs shadow removal for a digital image. For example, the meta-shadow system utilizes the shadow analyzer model which is based on a shadow CM-GAN model discussed below (e.g., co-modulation generative adversarial network) that performs inpainting for a shadow removed from a digital image. For instance, the shadow analyzer model includes an encoder for extracting features from the digital image and the object mask. Moreover, the shadow analyzer model includes a detector integrated with a decoder of the shadow analyzer model that allows the meta-shadow system to predict a shadow mask of the object associated with the object mask (e.g., based on multi-scale features from the digital image and the object mask).

As also mentioned above, the meta-shadow system utilizes a shadow synthesis model for synthesizing new shadows. Specifically, the meta-shadow system utilizes the shadow synthesis model that includes a diffusion-based network conditioned on intermediate features extracted by the shadow analyzer model. For example, the meta-shadow system injects intermediate features from the shadow analyzer model to an adapter of the shadow synthesis model to influence the synthesis of new shadows. In some embodiments, by leveraging the intermediate features from the shadow analyzer model, the meta-shadow system generates high-quality shadows with improved color, intensity, and a shape consistent with the associated object (e.g., relative to conventional systems).

As further mentioned above, the meta-shadow system integrates a joint framework that includes both the shadow analyzer model and the shadow synthesis model. Specifically, the meta-shadow system establishes a pipeline for scene-based image editing to remove a shadow for a specified object, retain intermediate features for the removed shadow, and in response to subsequent user-interactions (e.g., object relocation), synthesize a new shadow from the retained intermediate features for the removed shadow. Thus, the meta-shadow system implements a joint-framework that operates in tandem to perform complex object manipulation tasks.

As mentioned above, conventional systems suffer from a variety of issues related to efficiency, accuracy, and operational flexibility. Specifically, conventional systems suffer from computational inefficiencies. For example, for shadow-related tasks, conventional systems focus on a single task at a time. For instance, conventional systems typically utilize a shadow detection model to estimate a shadow mask and utilize a predicted shadow mask as input to a shadow removal model to obtain a shadow-free image. As a result, conventional systems require two separate models for shadow detection and removal-which increases the overall computational complexity for shadow related tasks. In some embodiments, in terms of memory and processing time, conventional systems consume a high number of computational resources for performing shadow related tasks of detection and removal.

Moreover, in some embodiments, conventional systems often suffer from inefficiencies during shadow synthesis due to conventional systems requiring multiple iterations to generate a satisfactory shadow. Specifically, conventional systems often require multiple attempts to accurately synthesize a shadow that is globally and locally consistent with the digital image scene, or even fail to synthesize a reasonable shadow (e.g., the color/intensity/shape is inconsistent with original or other shadows in the image). Because of this, conventional systems further suffer from consuming additional memory and processing power.

In addition to these computational inefficiencies, conventional systems further suffer from computational inaccuracies. Specifically, conventional systems require two separate models that separately perform their tasks of shadow detection and shadow removal. For example, conventional systems suffer from accumulated errors separately performed by each of the models which leads to inaccurate detection of pixels relating to a shadow and/or inaccurate removal of shadow pixels. In instances where conventional systems inaccurately detect pixels relating to a shadow, conventional systems also inaccurately remove the shadow.

Furthermore, conventional systems during shadow synthesis also suffer from computational inaccuracies. Specifically, conventional systems utilize models that account for environmental variables (e.g., light and camera position) to generate shadows. However, conventional systems typically fail to estimate light/camera position, which results in inaccurate shadow synthesis or requiring user multiple attempting.

Relatedly, conventional systems also suffer from operational inflexibilities. Specifically, conventional systems fail to accurately and efficiently scale to editing pipelines that involve multiple object manipulations (e.g., shadow detection, removal, and/or synthesis). For instance, because conventional systems employ separate models to perform the tasks of detection, removal, and synthesis, editing pipelines that involve a large volume of object manipulations usually fail to be performed in an accurate and efficient manner. Thus, conventional systems are rigidly limited to a small range of use-cases.

In one or more embodiments, the meta-shadow system provides several improvements over conventional systems in relation to efficiency, accuracy, and operational flexibility. Specifically, the meta-shadow system improves upon computational inefficiencies by integrating shadow detection and shadow removal into the shadow analyzer model. For instance, unlike conventional systems which focus on a single task at a time, the meta-shadow system extracts various features from the digital image and an object mask to remove a shadow from a digital image (e.g., and to further predict a shadow mask). In some embodiments, rather than repeating various processing tasks, the meta-shadow system integrates the shadow detection and shadow removal task into a unified model (e.g., by integrating the shadow detector with a decoder of the CM-GAN) which saves computational resources and utilizes less memory and processing time to accomplish shadow detection and removal.

In some embodiments, the meta-shadow system also further experiences efficiency improvements for shadow synthesis tasks. Specifically, the meta-shadow system integrates the shadow synthesis model with the shadow analyzer model to reduce the number of iterations needed to synthesize a shadow. For example, the meta-shadow system injects intermediate features from the shadow analyzer model into the shadow synthesis model to improve the quality and consistency of a synthesized shadow with the rest of the digital image. Accordingly, the meta-shadow system reduces the number of iterations needed to synthesize a shadow.

In one or more embodiments, the meta-shadow system improves upon computational inaccuracies. Specifically, as mentioned, the meta-shadow system integrates shadow detection and shadow removal into the shadow analyzer model. For instance, the meta-shadow system receives as input the digital image and an object mask to detect and remove shadows via the shadow analyzer model. In other words, the meta-shadow system does not separately perform tasks in isolation and repeat processing tasks but accomplishes both tasks with a single model. In doing so, the meta-shadow system avoids accumulating errors that result from separately performing detection and removal tasks. As such, the meta-shadow system more accurately detects pixels relating to a shadow and also more accurately removes shadows from a digital image.

Moreover, in some embodiments, the meta-shadow system also rectifies inaccuracy issues faced by conventional systems during shadow synthesis. Specifically, the meta-shadow system does not merely rely on environmental variables within the current digital image to synthesize shadows, rather the meta-shadow system also receives intermediate features (e.g., the shadow mask, such as the multi-scale features) from the shadow analyzer model and injects the intermediate features to the shadow synthesis diffusion model through an adapter. Accordingly, the meta-shadow system more accurately synthesizes shadows in a digital image by referencing shadow properties initially removed from the digital image.

Related to the improvements above, the meta-shadow system also improves upon operational flexibility. Specifically, the meta-shadow system accurately and efficiently scales to editing pipelines that involve multiple object manipulations in various different manners (e.g., object relocations such as moving an object within a digital image, inserting an object form a different digital image, etc.). For instance, the meta-shadow system scales up to these editing pipelines by integrating the joint shadow detection-removal framework with the shadow synthesis framework.

Additional details regarding the meta-shadow system will now be provided with reference to the figures. For example, FIG. 1 illustrates a schematic diagram of an exemplary system environment 100 in which a meta-shadow system 102 operates. As illustrated in FIG. 1, the system environment 100 includes server(s) 104, a digital image system 106, a network 108, and a client device 116. Additionally, FIG. 1 illustrates that the digital image system 106 includes the meta-shadow system 102 and the meta-shadow system 102 further includes a shadow analyzer model 110 and a shadow synthesis model 112. Moreover, the client device 116 includes a client application 118.

Although the system environment 100 of FIG. 1 is depicted as having a particular number of components, the system environment 100 is capable of having a different number of additional or alternative components (e.g., a different number of servers, client devices, or other components in communication with the meta-shadow system 102 via the network 108). Similarly, although FIG. 1 illustrates a particular arrangement of the server(s) 104, the network 108, and the client device 116, various additional arrangements are possible.

The server(s) 104, the network 108, and the client device 116 are communicatively coupled with each other either directly or indirectly (e.g., through the network 108 discussed in greater detail below in relation to FIG. 18). Moreover, the server(s) 104 and the client device 116 include one or more of a variety of computing devices (including one or more computing devices as discussed in greater detail in relation to FIG. 18).

As mentioned above, the system environment 100 includes the server(s) 104. In one or more embodiments, the server(s) 104 process input for generating a modified digital image, such as object manipulations within a digital image to remove a shadow or synthesize a shadow. In one or more embodiments, the server(s) 104 comprise a data server. In some implementations, the server(s) 104 comprise a communication server or a web-hosting server.

In some embodiments, the client device 116 includes computing devices associated with the one or more user accounts that perform object manipulations in a scene-based image editing interface by using the shadow analyzer model 110 and the shadow synthesis model 112. For instance, the meta-shadow system 102 trains the shadow analyzer model 110 and the shadow synthesis model 112 using a training dataset provided from an additional client device.

In one or more embodiments, the client device 116 includes smartphones, tablets, desktop computers, laptop computers, head-mounted-display devices, or other electronic devices. The client device 116 includes one or more software applications (e.g., the client application 118) for generating or modifying digital images in accordance with the digital image system 106. In one or more embodiments, the client application 118 includes a software application hosted on the server(s) 104 accessible by the client device 116 through another application, such as a web browser.

To provide an example implementation, in some embodiments, the meta-shadow system 102 on the server(s) 104 supports the meta-shadow system 102 on the client device 116. For instance, in some cases, the digital image system 106 on the server(s) 104 gathers data for the meta-shadow system 102. In response, the meta-shadow system 102, via the server(s) 104, provides the information to the client device 116. In other words, the client device 116 obtains (e.g., downloads) the meta-shadow system 102 from the server(s) 104. Once downloaded, the meta-shadow system 102 on the client device 116 provides tools for performing the object manipulation process (e.g., object relocation which results in shadow removal and/or shadow synthesis).

In alternative implementations, the meta-shadow system 102 includes a web hosting application that allows the client device 116 to interact with content and services hosted on the server(s) 104. To illustrate, in one or more implementations, the client device 116 access a software application supported by the server(s) 104. In response, the meta-shadow system 102 on the server(s) 104 provides tools for performing digital image editing.

Indeed, in some embodiments, the meta-shadow system 102 is implemented in whole, or in part, by the individual elements of the system environment 100. For instance, although FIG. 1 illustrates the meta-shadow system 102 implemented or hosted on the server(s) 104, different components of the meta-shadow system 102 are able to be implemented by a variety of devices within the system environment 100. For example, one or more (or all) components of the meta-shadow system 102 are implemented by a different computing device or a separate server from the server(s) 104. Indeed, as shown in FIG. 1, the client device 116 includes the meta-shadow system 102. Example components of the meta-shadow system 102 will be described below with regard to FIG. 14.

Figure 2A:
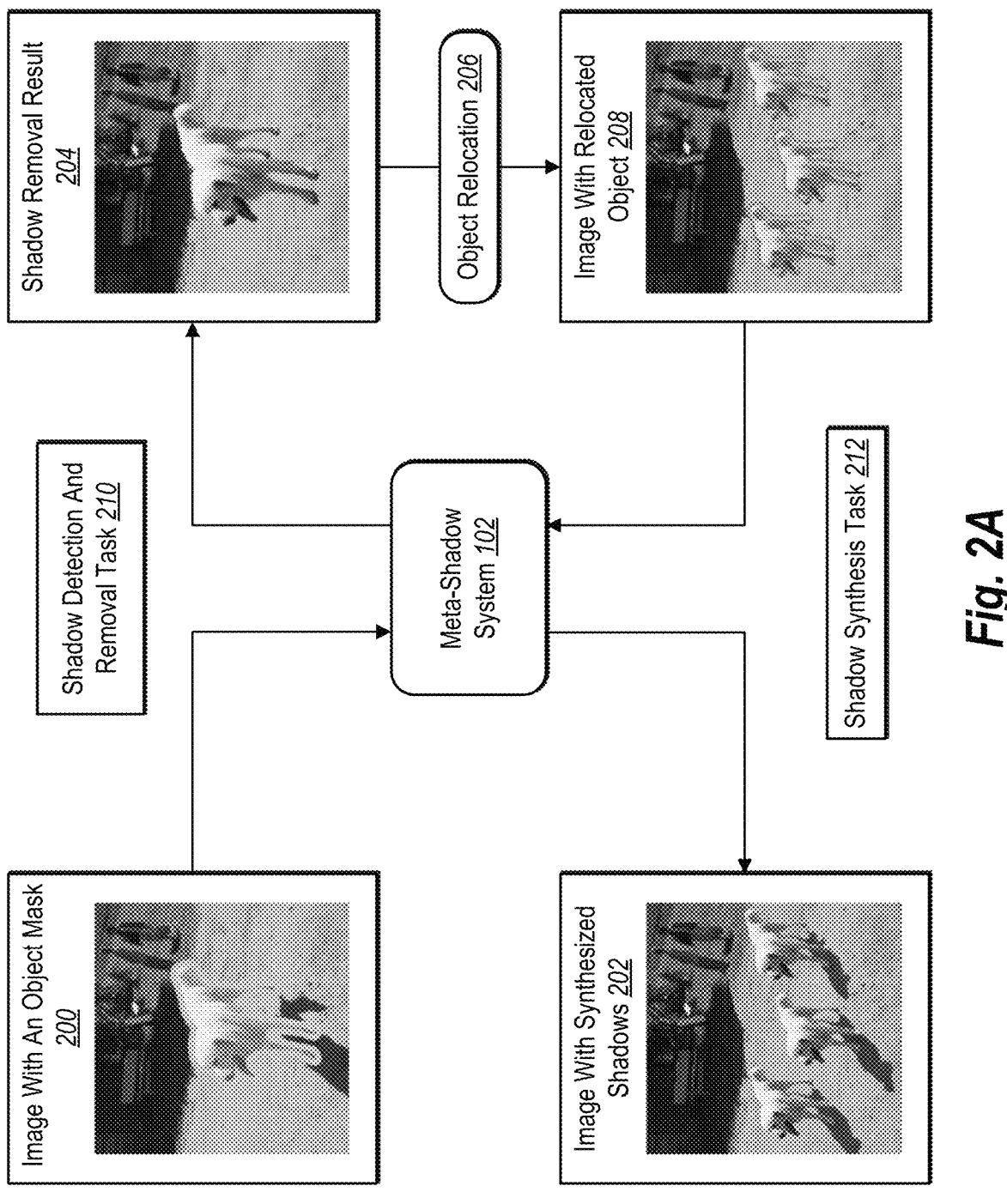
FIGS. 2A-2B illustrates an overview of the meta-shadow system detecting, removing, and synthesizing shadows in accordance with one or more embodiments.

As mentioned above, in certain embodiments, the meta-shadow system 102 includes an entire pipeline for detection, removal, and synthesis of shadows. FIG. 2A illustrates an overview figure of the meta-shadow system 102 detecting a shadow, removing the shadow, and in response to an object relocation, synthesizing shadows in accordance with one or more embodiments.

Shadows play a vital role in enhancing the realism of an image, providing strong cues on the perception of the three-dimensional space and the spatial relations between objects in the scene. Specifically, image editing tasks involving shadows typically includes removal of unwanted objects and object relocation (e.g., insertion, moving, etc.). As alluded to above, in some embodiments, the meta-shadow system 102 improves on the image editing tasks by detecting/removing shadows and synthesizing shadows in a coherent and realistic manner (e.g., by integrating the tasks in a unified manner).

As shown in FIG. 2A, the meta-shadow system 102 collectively deals with the tasks of shadow detection, shadow removal, and shadow removal in an object-centered fashion. Specifically, the meta-shadow system 102 deals with the tasks in an object-centered fashion by associating each object with the shadows cast by itself in the environment, such that editing an object results in its associated shadow being manipulated with the edited object.

FIG. 2A shows the meta-shadow system 102 receiving an image with an object mask 200. In some embodiments, the digital image portrays a static, two-dimensional image. In particular, the digital image portrays a two-dimensional projection of a scene that was captured from the perspective of a camera. Accordingly, the digital image reflects the conditions (e.g., the lighting, the surrounding environment, or the physics to which the portrayed objects are subject) under which the image was captured; however, it does so statically. In other words, the conditions are not inherently maintained when changes to the digital image are made.

In some embodiments, the digital image includes a digital frame composed of various pictorial elements. In particular, the pictorial elements include pixel values that define the spatial and visual aspects of the digital image. For example, the digital image contains a digital frame where objects within the frame are visible while objects outside of the frame are not visible. For instance, the digital image includes a plurality of individual pixels that depict one or more object(s).

Moreover, a scene includes visual elements within a digital image that depict a specific environment or scenario. In particular, the scene includes objects, background elements, foreground elements, lighting, colors, and other visual elements that convey a specific narrative. For instance, the scene includes a subject or theme such as a nature landscape, a busy city street, a home, or a sporting event.

In some embodiments, an object includes a visual representation of a subject in an image. In particular, an object refers to a set of pixels in an image that combines to form a visual depiction of an item, article, or element. An object can correspond to a wide range of classes and concepts. In some embodiments, a digital image includes multiple instances (e.g., occurrences) of an object. For example, an image of a bouquet of roses includes multiple instances of roses.

In one or more embodiments, an object mask includes a map of a digital image that has an indication for each pixel of whether the pixel corresponds to part of an object (or other semantic area) or not. In some implementations, the indication includes a binary indication (e.g., a "1" for pixels belonging to the object and a "0" for pixels not belonging to the object). In alternative implementations, the indication includes a probability (e.g., a number between 1 and 0) that indicates the likelihood that a pixel belongs to an object. In such implementations, the closer the value is to 1, the more likely the pixel belongs to an object and vice versa.

As shown, the meta-shadow system 102 receives the image with the object mask 200 and performs a shadow detection and removal task 210. Specifically, as shown, from performing the shadow detection and removal task 210, the meta-shadow system 102 generates a shadow removal result 204 depicted as a modified digital image relative to the image with the object mask 200.

As shown, the meta-shadow system 102 removes a shadow from a digital image. For example, a shadow includes a dark area or shape cast onto a surface from an object when the object blocks a source of light. Furthermore, a shadow varies in size, shape and intensity depending on an angle of the object positioned in front of a light source. For instance, a shadow from an object within a digital image includes a two-dimensional representation. Moreover, the shadow from the object is typically cast onto a surface and various properties of the surface is still visible due to the shadow's translucent nature.

As also mentioned, the shadow removal result 204 is depicted as a modified digital image. For example, an image modification refers to any change, alteration, or enhancement performed to or on a digital image file. In particular, the term image modification includes any change, alteration, or enhancement of pixels within the digital image file. To illustrate, image modification includes the addition of a shape, the use of a brush, the addition of a layer, or a color change. Any change between a selected version and a previous version includes an image modification. For instance, changes to the pixel values of a digital image results in an image modification. Accordingly, the shadow removal result 204 depicts a modified digital image that removed the shadow of the dog and inpainted pixels corresponding to the removed shadow.

As shown in FIG. 2A, the meta-shadow system 102 further receives an indication of an object relocation 206. As shown, the indication of the object relocation 206 includes inserting two additional copies of the dog into the modified digital image to generate an image with relocated object 208. As shown, in response to the object relocation 206, the meta-shadow system 102 further performs the shadow synthesis task 212. As shown, the meta-shadow system 102 generates an image with synthesized shadows 202 which shows all three dogs in the digital image with a corresponding shadow. As was discussed above and is discussed below, the meta-shadow system 102 leverages features from the shadow detection and removal task 210 to synthesize the shadows by informing the diffusion model with intermediate features from the shadow analyzer model.

Figure 2B:
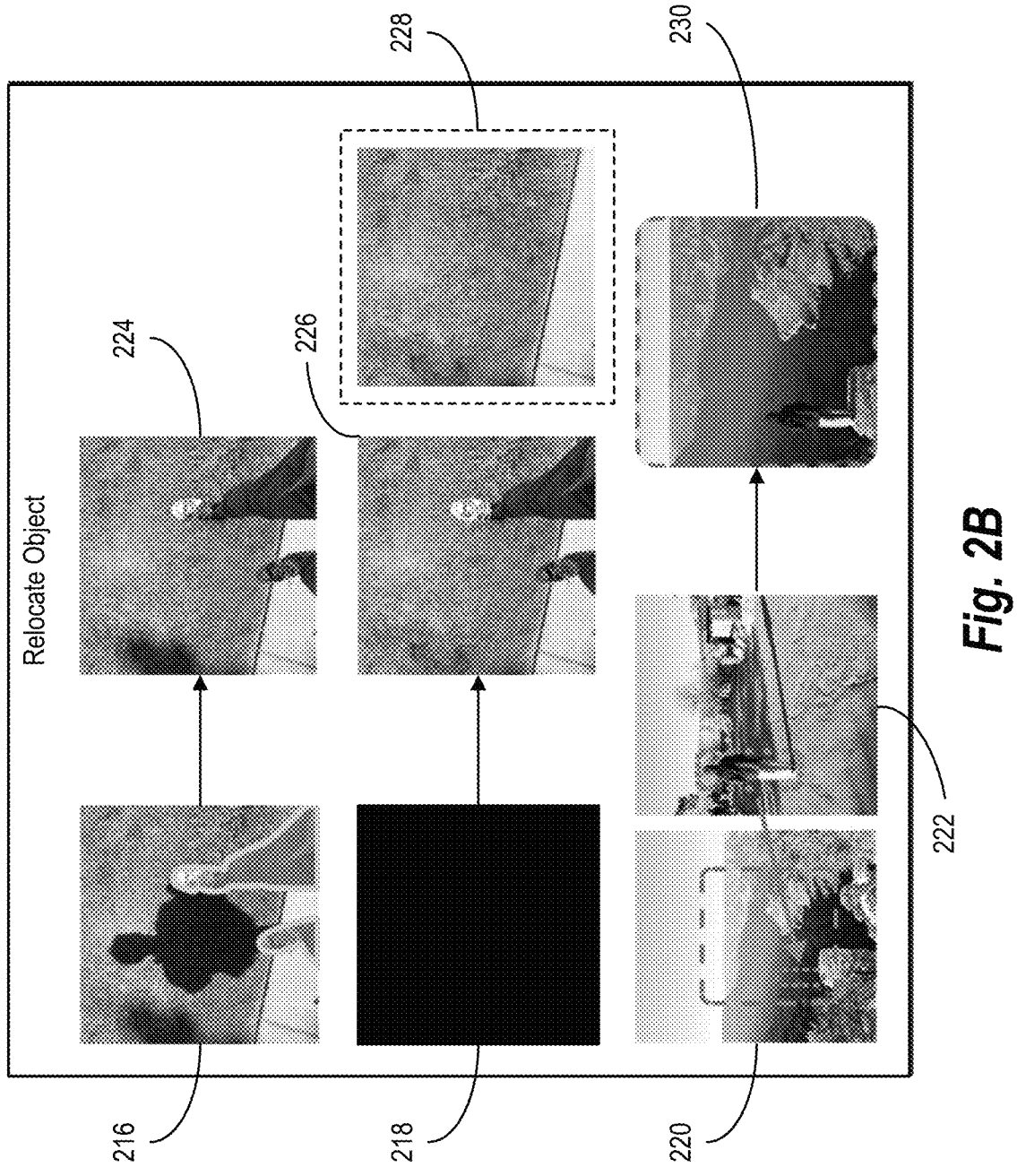

FIG. 2B illustrates the meta-shadow system 102 receiving an indication to relocate an object in accordance with one or more embodiments. Specifically, an indication to relocate an object includes receiving a user interaction to modify the object by moving an object in a digital image from a first location in the digital image to a second location in the digital image. Moreover, the indication to relocate an object includes receiving a user interaction to modify the object by adding the object to a location of the digital image, where the object originates from a different digital image.

For example, FIG. 2B shows a first user input 216 that includes a selection of an object (e.g., the person's legs) within a digital image. Moreover, FIG. 2B shows that in response to the first user input 216, the meta-shadow system 102 further accesses an object mask associated with the selected object. As shown, based on the first user input 216, the meta-shadow system 102 generates a first output 224 that removes a shadow associated with the object mask of the selected object.

FIG. 2B further illustrates the meta-shadow system 102 receiving a second user input 218. For instance, the second user input 218 includes a user interaction of submitting an empty mask with a digital image (e.g. the digital image depicted with the first user input 216). For instance, as mentioned above, an object mask includes a map of a digital image that has an indication for each pixel of whether the pixel corresponds to part of an object. In contrast, an empty mask refers to a mask where no specific region or object is defined. Specifically, an empty mask includes a blank canvas where all pixels are set to zero or some other neutral value. In other words, the meta-shadow system 102 utilizes empty masks as a placeholder. As shown, in response to the second user input 218, the meta-shadow system 102 removes all shadows from a digital image and generates a second output 226. Alternatively, in some embodiments, the meta-shadow system removes an unwanted object (e.g., the person's legs and the shadows cast into the digital image) from a digital image and generates a third output 228.

Furthermore, FIG. 2B illustrates a third user input 220 and a fourth user input 222 that includes a first scene of a digital image (e.g., mountain scene) and a second scene of a digital image (e.g., person walking down the street near the mountain scene). Specifically, the third user input 220 and the fourth user input 222 includes the meta-shadow system 102 inserting the person from the second scene onto the mountains within the first scene. For instance, FIG. 2B shows the meta-shadow system 102 generating a fourth output 230 that shows the person in the mountain scene with a newly synthesized shadow. As is explained in more detail below, the meta-shadow system 102 removes the shadow from the second scene (e.g., based on the fourth user input 222) and injects the shadow features from removing the shadow in the second scene into the first scene when synthesizing the new shadow.

Figure 3:
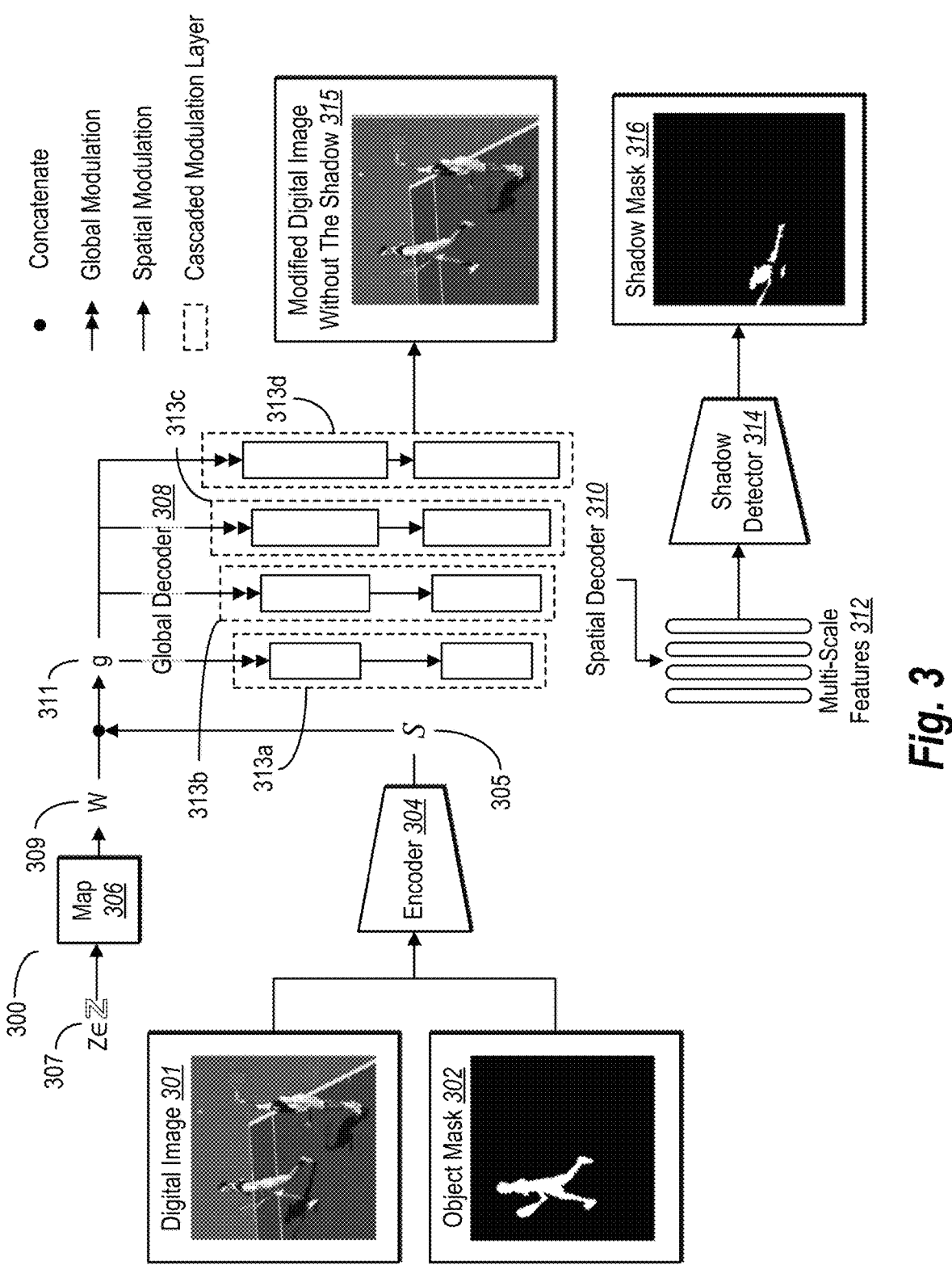
FIG. 3 illustrates an example diagram of the meta-shadow system receiving a digital image and an object mask and removing a shadow in the digital image and generating a shadow mask prediction in accordance with one or more embodiments.

As mentioned above, in certain embodiments, the meta-shadow system 102 includes a shadow analyzer model for detection and removal of shadows. FIG. 3 illustrates a detailed architecture of the shadow analyzer model that includes both shadow detection and shadow removal. For example, FIG. 3 shows the meta-shadow system 102 receiving a digital image 301 and an object mask 302. Specifically, the meta-shadow system 102 utilizes a shadow analyzer model 300 to extract features from the digital image 301 and the object mask 302 to generate a modified digital image 315 without a shadow.

In some embodiments, the shadow analyzer model includes a generative adversarial neural network specifically tuned to inpaint regions of a digital image containing shadow(s). For instance, the meta-shadow system 102 utilizes the generative adversarial neural network to perform modulation when removing a shadow from the digital image 301. Specifically, modulation includes scaling and shifting features of the inpainting GAN. In particular, modulation includes both spatially varying and spatially invariant scaling and shifting.

For instance, the meta-shadow system 102 implements model-architecture described by Soo Ye Kim in U.S. patent application Ser. No. 18/532,485, titled TEXTURE-PER-SERVING SHADOW REMOVAL IN DIGITAL IMAGES UTILIZING GENERATING INPAINTING MODELS, which is hereby incorporated by reference in its entirety.

Additionally, details of fine-tuning the CM-GAN are given below in the description of FIG. 8.

As shown, FIG. 3 illustrates an example architecture of the shadow analyzer model 300 implemented with architecture that includes a cascaded modulation inpainting neural network. As illustrated, the shadow analyzer model 300 includes an encoder 304 and a decoder (e.g., global decoder 308 and a spatial decoder 310). In particular, the encoder 304 includes a plurality of convolutional layers at different scales/resolutions. In some cases, the meta-shadow system 102 feeds the digital image 301 (e.g., an encoding of the digital image) and an object mask 302 (e.g., an encoding of the object mask) into the first convolutional layer to generate an encoded feature vector at a higher scale (e.g., lower resolution). The second convolutional layer processes the encoded feature vector at the higher scale (lower resolution) and generates an additional encoded feature vector (at yet another higher scale/lower resolution). The encoder 304 of the shadow analyzer model iteratively generates these encoded feature vectors until reaching the final/highest scale convolutional layer and generating a final encoded feature vector representation of the digital image.

As illustrated, in one or more embodiments, the shadow analyzer model 300 generates a global feature code 311 from the final encoded feature vector of the encoder 304. A global feature code 311 includes a feature representation of the digital image 301 from a global (e.g., high-level, high-scale, low-resolution) perspective. In particular, the global feature code 311 includes a representation of the digital image 301 that reflects an encoded feature vector at the highest scale/lowest resolution (or a different encoded feature vector that satisfies a threshold scale/resolution).

As illustrated, in one or more embodiments, the shadow analyzer model 300 applies a neural network layer (e.g., a fully connected layer) to the final encoded feature vector to generate a global style code 305 (e.g., a style vector). In addition, the shadow analyzer model 300 generates the global feature code 311 by combining the global style code 305 with a random style code 309. In particular, the shadow analyzer model 300 generates the random style code 309 by utilizing a neural network layer (e.g., a multi-layer perceptron) to process an input noise vector 307, generate a map 306 and further generate the random style code 309. The neural network layer maps the input noise vector to the random style code 309. The shadow analyzer model 300 combines (e.g., concatenates) the random style code 309 with the global style code 305 to generate the global feature code 311. Although FIG. 3 illustrates a particular approach to generate the global feature code 311, the meta-shadow system 102 is able to utilize a variety of different approaches to generate the global feature code 311 that represents encoded feature vectors of the encoder 304 (e.g., without the global style code 305 and/or the random style code 309).

As further shown in FIG. 3, the shadow analyzer model 300 also includes a decoder (e.g., the global decoder 308 and the spatial decoder 310). As shown, the decoder includes a plurality of cascaded modulation layers 313a-313d. The cascaded modulation layers 313a-313d process input features (e.g., input global feature maps and input local feature maps) to generate new features (e.g., new global feature maps and new local feature maps). In particular, each of the cascaded modulation layers 313a-313d operate at a different scale/resolution. Thus, the first cascaded modulation layer 313a takes input features at a first resolution/scale and generates new features at a lower scale/higher resolution (e.g., via upsampling as part of one or more modulation operations). Similarly, additional cascaded modulation layers operate at further lower scales/higher resolutions until generating the inpainted digital image at an output scale/resolution (e.g., the lowest scale/highest resolution).

Moreover, each of the cascaded modulation layers 313a-313d include multiple modulation blocks. For example, with regard to FIG. 3 the first cascaded modulation layer 313a includes a global modulation block and a spatial modulation block. In particular, the decoder of the shadow analyzer model 300 performs a global modulation with regard to input features of the global modulation block. Moreover, the shadow analyzer model 300 performs a spatial modulation with regard to input features of the spatial modulation block. By performing both a global modulation and spatial modulation within each cascaded modulation layer, the meta-shadow system 102 refines global positions to generate more accurate inpainted digital images.

As illustrated, the cascaded modulation layers 313a-313d are cascaded in that the global modulation block feeds into the spatial modulation block. Specifically, the shadow analyzer model 300 performs the spatial modulation at the spatial modulation block based on features generated at the global modulation block. To illustrate, in one or more embodiments the shadow analyzer model 300 utilizes the global modulation block to generate an intermediate feature. The shadow analyzer model 300 further utilizes a convolutional layer (e.g., a 2-layer convolutional affine parameter network) to convert the intermediate feature to a spatial tensor. The shadow analyzer model 300 utilizes the spatial tensor to modulate the input features analyzed by the spatial modulation block.

As shown, the meta-shadow system 102 generates the modified digital image 315 without the shadow. As shown, the modified digital image 315 depicts the person nearer the top of the image with the shadow removed. Moreover, the meta-shadow system 102 inpaints/generates a content fill to replace the removed shadow. For example, a content fill includes a set of pixels generated to replace another set of pixels of a digital image that is consistent with the digital image based on global and spatial features extracted from the digital image. Indeed, in some embodiments, a content fill includes a set of replacement pixels for replacing another set of pixels. For instance, in some embodiments, a content fill includes a set of pixels generated to fill a hole (e.g., a content void) that remains after (or if) a set of pixels (e.g., a set of pixels portraying an object) has been removed from or moved within a digital image. In some cases, a content fill corresponds to a background of a digital image.

To illustrate, in some implementations, a content fill includes a set of pixels generated to blend in with a portion of a background proximate to an object that could be moved/removed. In some cases, a content fill includes an inpainting segment, such as an inpainting segment generated from other pixels (e.g., other background pixels) within the digital image. In some cases, a content fill includes other content (e.g., arbitrarily selected content or content selected by a user) to fill in a hole or replace another set of pixels. For instance, the meta-shadow system 102 generates the content fill by accessing lighting data (e.g., intensity, direction, color of light source, etc.) and geometry (e.g., spatial arrangement and shape of objects in a digital image) of the scene of the digital image to generate pixels that are globally and locally consistent with a remainder of the digital image.

As further shown in FIG. 3, the meta-shadow system 102 further extracts multi-scale features 312 utilizing the global-spatial decoder. For instance, the meta-shadow system 102 represents the multi-scale features 312 as $$F_e^i (i \in [1, L]).$$

Accordingly, the meta-shadow system 102 extracts the global feature code 311 from $$F_e^L,$$

because the global feature code 311 reflects an encoded feature vector at the highest scale/lowest resolution. Moreover, the meta-shadow system 102 utilizes the global-spatial decoder to generate output features $$F_g^i$$

(e.g., the global feature map) and $$F_s^i$$

(e.g., the spatial feature map).

As just mentioned, the meta-shadow system 102 extracts the multi-scale features 312. As shown, the meta-shadow system 102 integrates a shadow detector 314 alongside the spatial decoder 310, which processes the multi-scale features 312. For example, the shadow detector 314 integrated alongside the spatial decoder 310 encourages the encoder 304 and the parallel decoders (e.g., the global decoder 308 and the spatial decoder 310) to accurately identify shadow regions. Specifically, the shadow detector 314 upsamples high-level features (e.g., from size 8 to 64) to a uniform size (e.g., 64×64). For instance, the meta-shadow system 102 utilizes the shadow detector 314 to combine (e.g., concatenate) the uniform size of the upsampled multi-scale features into a single feature map. To illustrate, the shadow detector 314 includes a sequence of convolution layers, batch normalization, and GELU layers, interspersed with transpose convolution layers. Additional details regarding the multi-scale features 312 are given below in FIG. 4.

As shown in FIG. 3, the meta-shadow system 102 utilizes the shadow detector 314 to generate a shadow mask 316 (e.g., a predicted output) with a 256×256 shadow mask. For instance, the meta-shadow system 102 obtains the shadow mask 316 from the shadow detector 314 via a sigmoid layer (e.g., a layer in a neural network architecture that applies sigmoid activation function to the outputs of the preceding layer). Moreover, the meta-shadow system 102 further interpolates the shadow mask 316 to match the size of the digital image 301.

Figure 4:
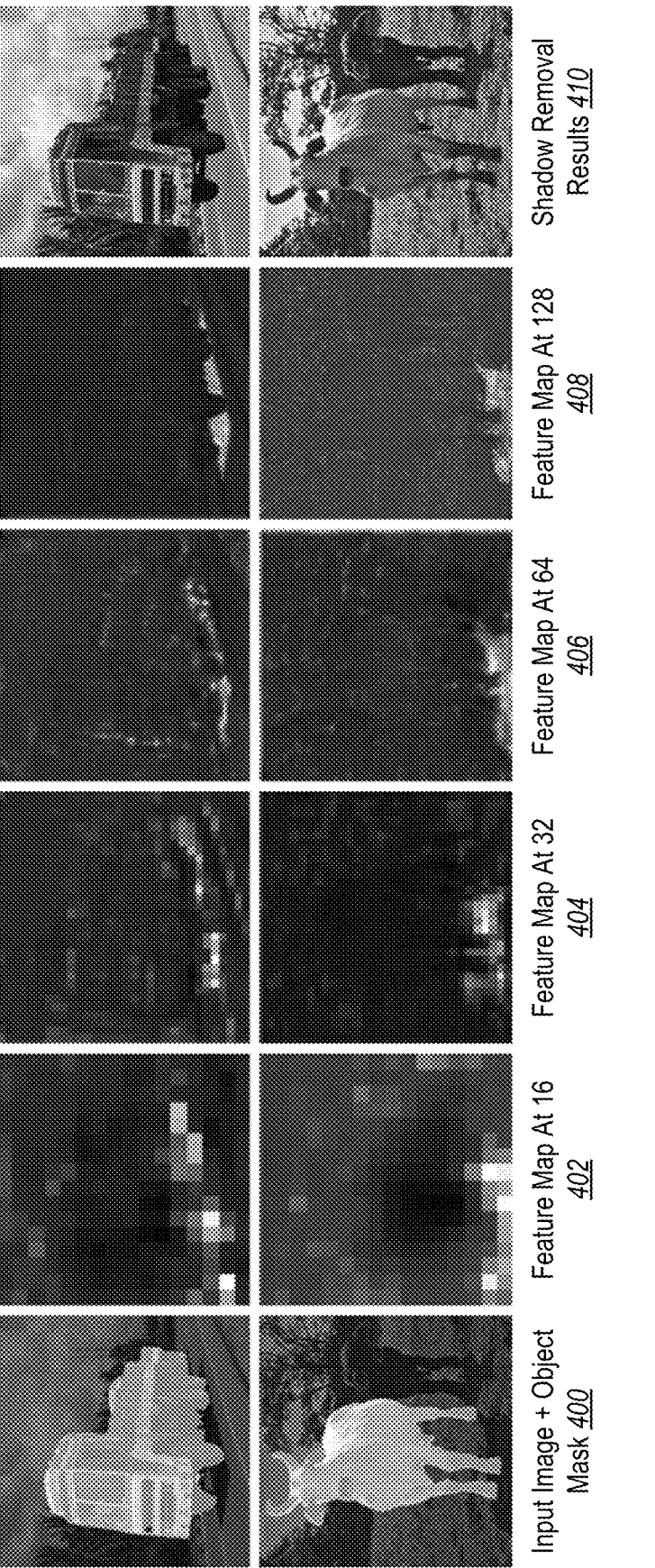
FIG. 4 illustrates an example diagram of the meta-shadow system extracting multi-scale features from a digital image and an object mask in accordance with one or more embodiments.

As mentioned above, the meta-shadow system 102 utilizes multi-scale features to generate a shadow mask prediction for a removed shadow. FIG. 4 illustrates examples of multi-scale features at different scales for an input digital image and a corresponding object mask in accordance with one or more embodiments. For example, multi-scale features refer to features or representations of the image and an object at different scales or resolutions. Specifically, the multi-scale features allow the meta-shadow system 102 to capture different levels of details simultaneously.

FIG. 4 shows two examples for an input image and object mask 400. The first example shows a digital image with an object mask corresponding to a truck and the second example shows a digital image with two animals and an object mask corresponding to one of the animals. Moreover, FIG. 4 illustrates the meta-shadow system 102 extracting feature maps of each of the examples at different resolutions/scales. For instance, FIG. 4 shows first feature maps 402 at a scale of 16, second feature maps 404 at a scale of 32, third feature maps 406 at a scale of 64, and fourth feature maps 408 at a scale of 128. Furthermore, as shown, the meta-shadow system generates shadow removal results 410 that removes the shadow for the corresponding masked object based on the multi-scale feature maps 402-408.

As illustrated, the feature map at 16 and the feature map at 32 highlight the shadow region of the masked object of the digital image. As the resolution/scale starts to increase (e.g., at 64 and at 128), the shadow region becomes more precise, but the texture of the digital image underlying the shadow region also starts to become more apparent. Accordingly, the meta-shadow system 102 references the multi-scale features at different resolutions/scales to obtain different level of details of the digital image.

Figure 5A:
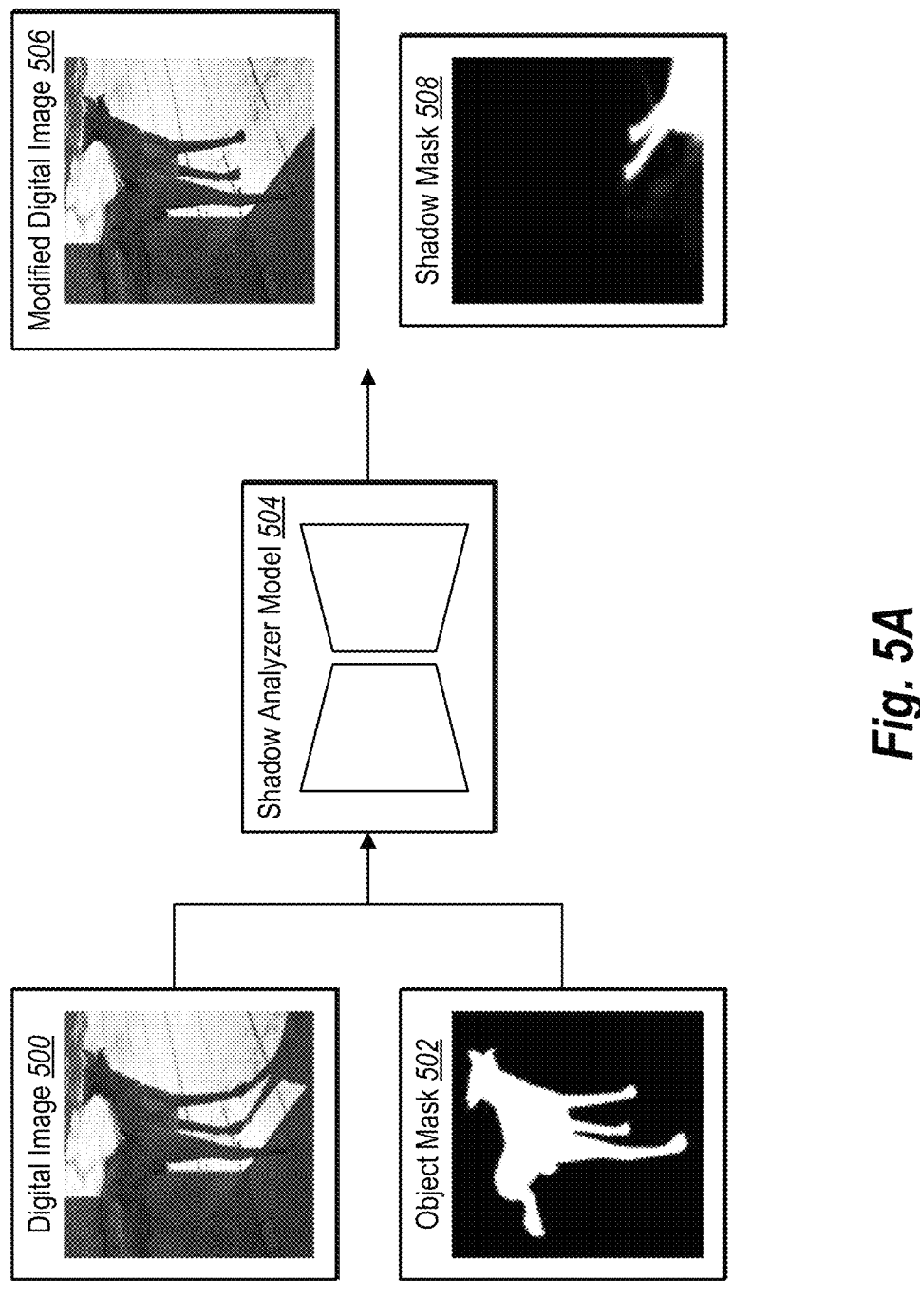
FIGS. 5A-5D illustrates example diagrams of the meta-shadow system removing one or more shadows under various conditions in accordance with one or more embodiments.

FIG. 5A illustrates the meta-shadow system 102 removing a shadow for a specific object even with the presence of additional shadows. For example, FIG. 5A shows the meta-shadow system utilizing a shadow analyzer model 504 to process a digital image 500 and an object mask 502 to generate a modified digital image 506 and a shadow mask 508. Specifically, the digital image 500 depicts an animal in the shadow of a building while the animal also casts its own shadow. Further, because the object mask 502 just indicates the animal, the meta-shadow system 102 utilizes the shadow analyzer model to just remove the shadow corresponding to the animal (e.g., the shadow analyzer model 504 does not modify the building shadow).

Figure 5B:
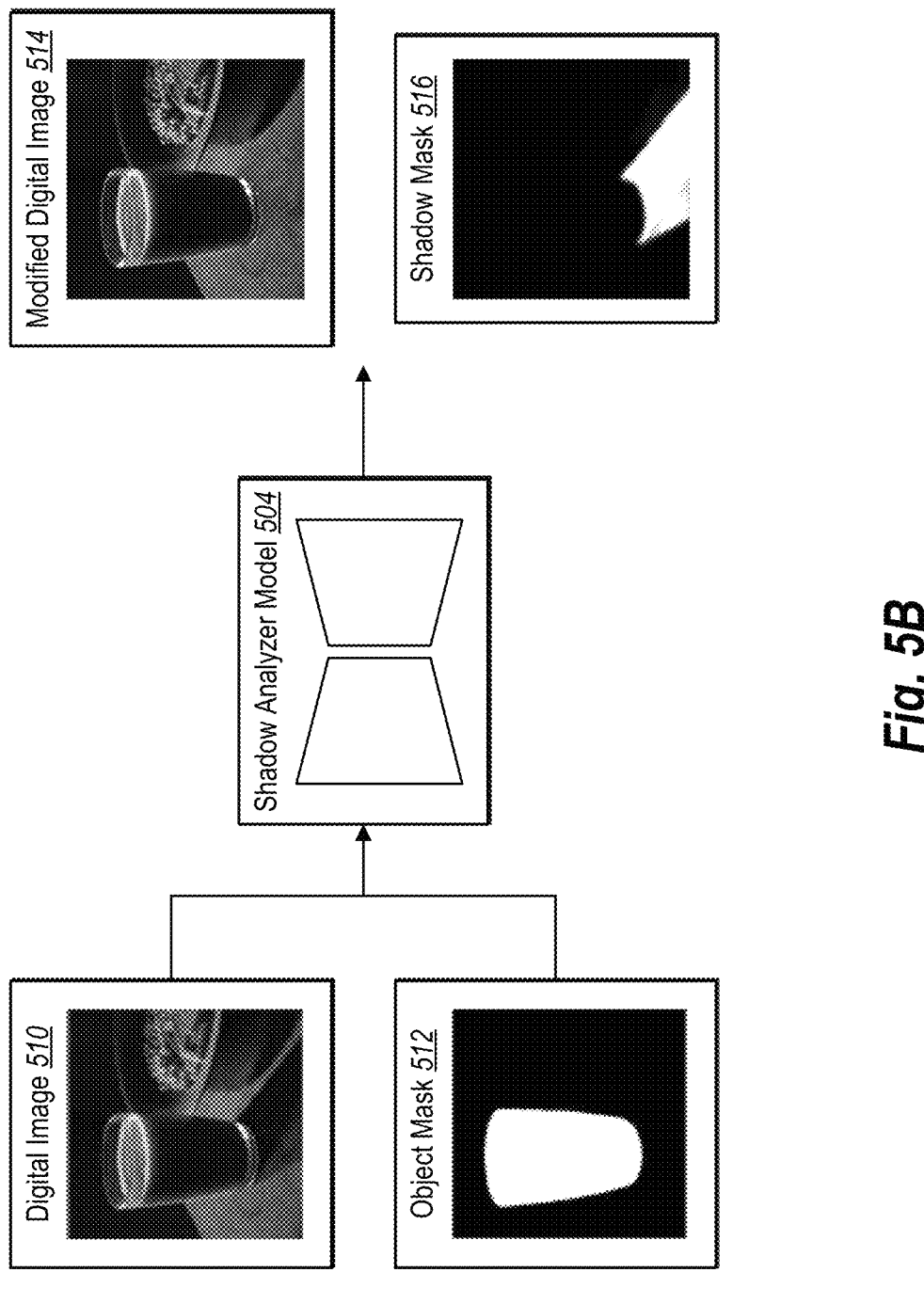

FIG. 5B illustrates the meta-shadow system 102 removing a shadow for a specific object even with the presence of multiple light sources. As shown, the meta-shadow system 102 receives a digital image 510 and an object mask 512 to generate a modified digital image 514 and a shadow mask 516. Specifically, the digital image 510 includes a cup with multiple light sources which creates a shadow with an interesting texture (e.g., shadow properties that vary across the digital image). Despite the multiple light sources, the meta-shadow system 102 generates the modified digital image 514 that correctly removes the shadow associated with the cup. In particular, the meta-shadow system 102 employs the shadow analyzer model 504 to process the object mask 512 and the digital image 510 which allows it to accurately identify the shadow of the cup (e.g., in line with the principles discussed above in FIG. 3).

Figure 5C:
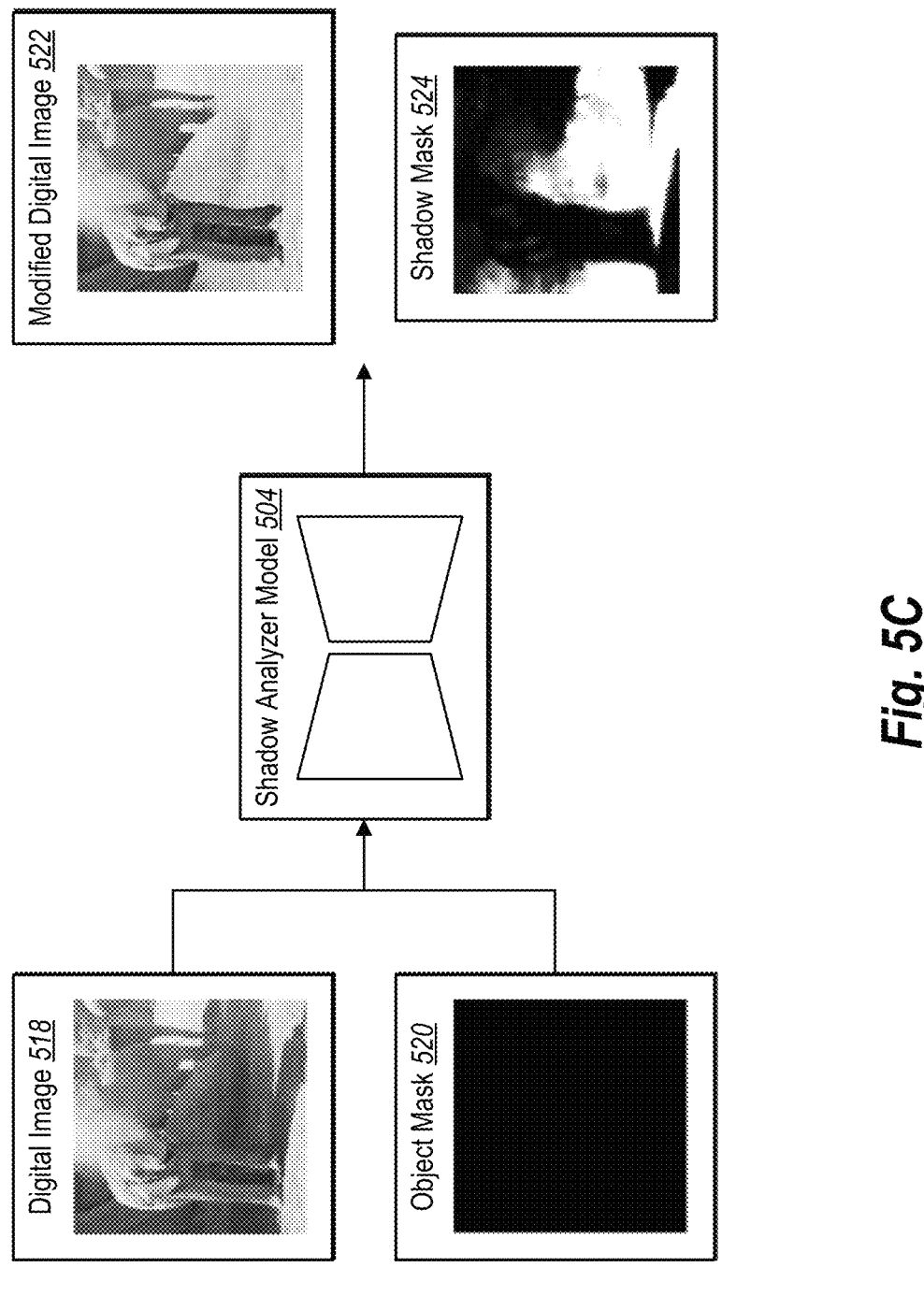

FIG. 5C illustrates the meta-shadow system 102 providing an object mask 520 that is an empty object mask and removing all shadows from a digital image 518. As mentioned above, the empty object mask acts as a placeholder and in some embodiments, indicates to the meta-shadow system 102 to remove all shadows from the digital image 518. As shown in FIG. 5C, the meta-shadow system 102 generates a modified digital image 522 and a shadow mask 524 utilizing the shadow analyzer model 504. Accordingly, FIG. 5C shows the meta-shadow system 102 removing the shadow associated with the elephant in the front, the rock, and the elephant in the back. If the object mask 520 was a specific object, such as the elephant in the front, rather than an empty mask, then the meta-shadow system 102 would remove just the shadow associated with the elephant in the front.

Figure 5D:
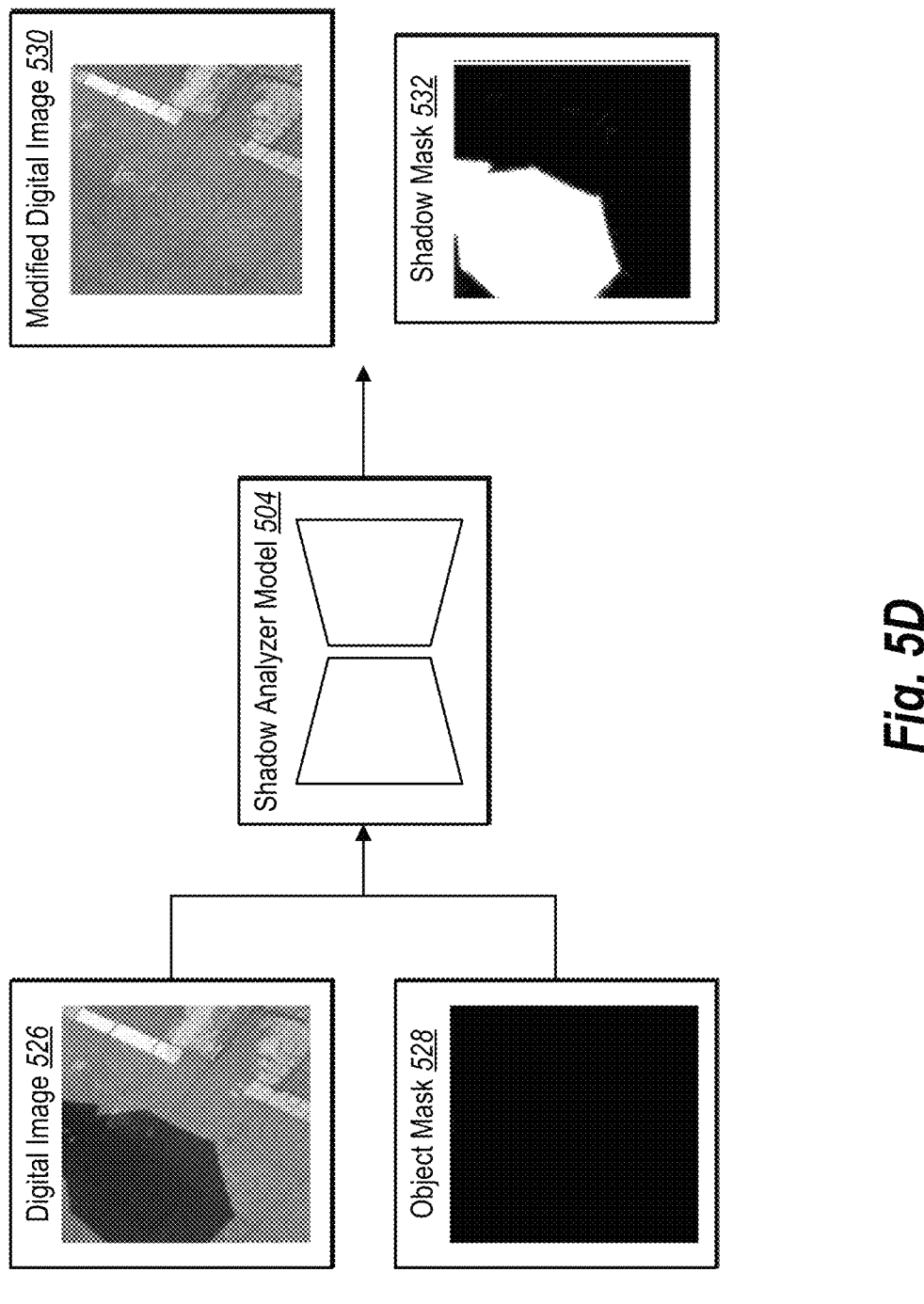

FIG. 5D illustrates the meta-shadow system 102 removing a shadow for an object outside of a frame of the digital image in accordance with one or more embodiments. Specifically, FIG. 5D shows a digital image 526 and an object mask 528. For example, since the digital image 526 depicts a shadow where the object is not visible within the frame of the digital image 526, the meta-shadow system 102 accesses an empty object mask. As a result of accessing an empty object mask, the meta-shadow system 102 utilizes the shadow analyzer model 504 to remove the shadow cast from the object outside of the frame of the digital image 526 to generate a modified digital image 530 and a shadow mask 532.

Figure 6:
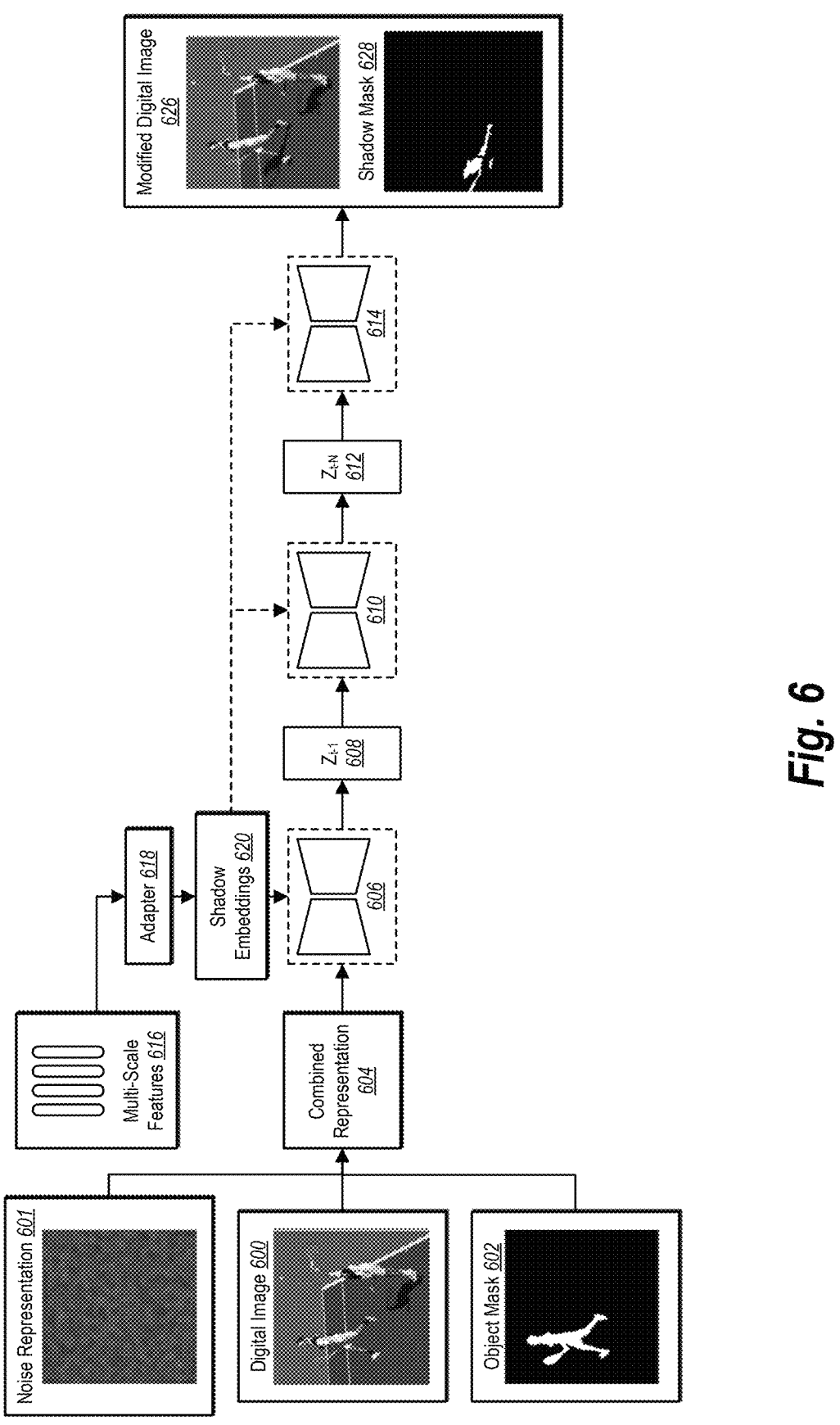
FIG. 6 illustrates an example diagram of the meta-shadow system synthesizing a new shadow for an object in a digital image based on intermediate features obtained from the shadow analyzer model in accordance with one or more embodiments.

As mentioned above, the meta-shadow system 102 also synthesizes shadows using a shadow synthesis model. FIG. 6 illustrates the meta-shadow system 102 utilizing a shadow synthesis diffusion model to generate a shadow for an object within a digital image in accordance with one or more embodiments. For example, some systems utilize diffusion-based models that inject text embeddings from a text encoder into the diffusion model. In one or more embodiments, the meta-shadow system 102 replaces the text embedding with an image embedding. For instance, the meta-shadow system 102 utilizes shadow features as the conditioning embeddings of a diffusion model.

FIG. 6 shows denoising neural networks (e.g., denoising layers) of the shadow synthesis diffusion model. Further, in some embodiments the meta-shadow system 102 implements a shadow synthesis diffusion model in a pixel color space, while in other embodiments the meta-shadow system 102 implements the shadow synthesis diffusion model in a latent vector space. As mentioned, the meta-shadow system 102 utilizes a diffusion neural network. In particular, during training of the diffusion neural network, a diffusion neural network receives as input a digital image and adds noise to the digital image through a series of steps. For instance, the meta-shadow system 102 utilizes a fixed Markov chain that adds noise to the data of the digital image until the diffusion representation is diffused. Furthermore, each step of the fixed Markov chain relies upon the previous step. Specifically, at each step, the fixed Markov chain adds Gaussian noise with variance which produces a diffusion representation. The meta-shadow system 102 adjusts the number of diffusion layers in the diffusion process (and the number of corresponding denoising layers in the denoising process).

During inference (e.g., implementation), the meta-shadow system 102 utilizes an iterative denoising process to generate digital images with shadows. For example, the meta-shadow system 102 receives a noise representation 601, an object mask 602 of an object (e.g., selected for shadow synthesis), and a digital image 600 depicting a scene. In one or more embodiments, the noise representation 601 includes the addition of random noise as input data. For instance, the noise representation includes Gaussian noise sampled from a normal distribution with a mean of zero and a specified standard deviation.

As shown in FIG. 6, the meta-shadow system 102 combines the object mask 602, the digital image 600, and the noise representation 601 to generate a combined representation 604. For instance, the meta-shadow system 102 combines the noise representation 601, the object mask 602 and the digital image 600 by concatenating the noise representation 601, the object mask 602, and the digital image 600. Specifically, the meta-shadow system 102 utilizes the object mask of a specific object as a reference point for which a shadow needs to be synthesized because the object mask contains information needed to understand the desired shape of the shadow.

For instance, the meta-shadow system 102 combines the object mask 602 and the digital image 600 to generate the combined representation 604 by combining the object mask 602 with the digital image that depicts the object manipulation (e.g., depicts the object moved to a second location). In other words, the combined representation 604 reflects the object manipulation indicated by a user interaction. Moreover, in some embodiments, where the object manipulation includes adding the object to a different digital image, the combined representation 604 includes a representation of the digital image with the object added from a different digital image.

In some embodiments, the combined representation 604 includes seven channels (e.g., three (R, G, and B channels) for the noise representation 601, one for the object mask 602, and three (R, G, and B channels) for the digital image 600). Moreover, the meta-shadow system 102 utilizes a diffusion neural network to process and generate a modified digital image 626 with a synthesized shadow and a shadow mask 628 from the combined representation 604.

As shown in FIG. 6, the meta-shadow system 102 via a first denoising neural network 606 receives the combined representation 604. Further, as shown, the first denoising neural network 606 generates a first denoised representation 608 (i.e., a partially denoised digital image) and iteratively repeats this process (10, 20, 50, or 100 times, etc.). For instance, as shown, the meta-shadow system 102 utilizes a Nth denoising neural network 610 to process the first denoised representation 608 (e.g., or a second, third, or x denoised representation) and generates an Nth denoised representation 612.

As also shown in FIG. 6, in some embodiments the meta-shadow system 102 performs an act of conditioning the first denoising neural network 606 and the Nth denoising neural network 614. In particular, the act includes conditioning each layer of the denoising neural networks 606 to 614. To illustrate, conditioning layers of a neural network includes providing context to the networks to guide the generation of a text-conditioned image (e.g., a digital image including a synthesized shadow). For instance, conditioning layers of neural networks include at least one of (1) transforming conditioning inputs (e.g., the multi-scale features from the shadow analyzer model) into vectors to combine with the denoising representations; and/or (2) utilizing attention mechanisms which causes the neural networks to focus on specific portions of the input and condition its predictions (e.g., outputs) based on the attention mechanisms. Specifically, for denoising neural networks, conditioning layers of the denoising neural networks includes providing an alternative input to the denoising neural networks (e.g., shadow embeddings 620). In particular, the meta-shadow system 102 provides alternative inputs to provide a guide in removing noise from the diffusion representation (e.g., the denoising process). Thus, the meta-shadow system 102 conditioning layers of the denoising neural networks acts as guardrails to allow the denoising neural networks to learn how to remove noise from an input signal and produce a clean output.

Specifically, conditioning the layers of the network includes modifying input into the layers of the denoising neural networks to combine with the noise representation 601. For instance, the meta-shadow system 102 combines (e.g., concatenates) vector values generated from the encoder at different layers of the denoising neural networks. For instance, the meta-shadow system 102 combines one or more conditioning vectors with the noise representation, or the modified noise representation. Thus, the denoising process considers the noise representation and the shadow embedding representation to generate shadow embedding-conditioned images (e.g., the modified digital image 626 with the synthesized shadow) and the shadow mask 628.

The above description includes details regarding conditioning of a diffusion-based model. The following description elaborates on conditioning the shadow synthesis diffusion model shown in FIG. 6 with shadow features. Specifically, as shown, the meta-shadow system 102 obtains multi-scale features 616 from the shadow analyzer model (e.g., discussed above) and utilizes the multi-scale features 616 to condition the shadow synthesis diffusion model. For example, the multi-scale features 616 capture the shadow characteristics such as intensity, softness, color, and direction of the shadow removed from a digital image. Moreover, in some embodiments, the meta-shadow system combines the shadow characteristics (e.g., shadow property data) to generate a feature map of the shadow mask.

In one or more embodiments, shadow intensity within a digital image includes a degree of darkness or lightness of a shadow cast by an object. Specifically, the shadow intensity indicates how the shadow contrasts with the surrounding area in terms of color and brightness. In one or more embodiments, shadow softness refers to a gradual transition between a shadowed region of an object and a surrounding area. For instance, shadow softness includes a degree of softness in the shadows that depends on the size and distance of a light source and the properties of the occluding object and the surrounding environment. Further, in some embodiments, shadow color refers to the hue, saturation, and brightness of the areas of darkness cast by an object in a digital image due to the absence or obstruction of light. Moreover, in some embodiments, the direction of the shadow refers to an orientation or angle of the shadow based on a position of a light source, and the surface upon which the shadow falls.

As shown in FIG. 4 above, the feature maps (e.g., 402-408) for the multi-scale features distinctly highlight the response of the shadow region (e.g., demonstrating the effectiveness of the shadow analyzer model in capturing shadow characteristics). However, FIG. 4 also illustrates that at larger resolutions (e.g., at 64 and 128), the shadow features gradually include texture information, which is not desired for the purpose of transferring shadow properties. In other words, the meta-shadow system 102 relies on shadow properties and not the texture underlying the shadow properties to synthesize new shadows efficiently and accurately.

With that in mind, in some embodiments, the meta-shadow system 102 resizes feature map of a shadow mask from a first size to a second size, where the second size is smaller than the first size. In other words, the meta-shadow system 102 resizes feature maps for the multi-scale features 616 with sizes ranging from 16 to 128 to a uniform size of 32×32. Furthermore, in some embodiments, the meta-shadow system 102 further combines the uniform feature maps (FMIs) and transfers the uniform feature maps to the shadow synthesis diffusion model shown in FIG. 6. Moreover, the meta-shadow system 102 utilizes an adapter 618 to align dimensions from the uniform feature maps (FMIs) to text tokens (e.g., text tokens utilized to condition the diffusion-based model). For instance, the adapter 618 transforms the uniform feature maps to be compatible as tokens to condition the shadow synthesis diffusion model. As shown, the meta-shadow system 102 generates shadow embeddings and utilizes the shadow embeddings to condition the layers of the denoising neural networks.

To illustrate, the adapter 618 includes a two-dimensional convolution layer to initially process the multi-scale features 616 followed by a one-dimensional convolution layer and further includes a multilayer perceptron (MLP) to resize the embedding dimension (e.g., from 1344 to 2048) such that a final shadow embedding ($E_s$) has dimensions of [N, 1024, 2048] (e.g., N represents a number of feature maps from the multi-scale features 616, 1024 represents an embedding size or feature dimensionality with a vector length of 1024, and 2048 represents an additional feature with an embedding size of 2048). Furthermore, the meta-shadow system 102 injects the final shadow embedding ($E_s$) into the shadow synthesis diffusion model by utilizing a cross-attention mechanism. Specifically, the meta-shadow system 102 utilizes a cross-attention mechanism to incorporate the shadow embedding at each step of the iterative denoising process, such that the shadow synthesis diffusion model attends to relevant parts of the shadow embedding to guide the synthesis of a shadow.

As shown in FIG. 6, the meta-shadow system 102 passes the Nth denoised representation 612 to an Nth denoising neural network 614 to generate the modified digital image 626 that includes a denoised digital image depicting the person on the top with a synthesized shadow.

To illustrate, in one or more embodiments, the meta-shadow system 102 incorporates the shadow synthesis model as described in Soo Ye Kim in U.S. patent application Ser. No. 18/532,457, filed on Dec. 7, 2023 and entitled SYNTHESIZING SHADOWS IN DIGITAL IMAGES UTILIZING DIFFUSION MODELS, which is hereby incorporated by reference in its entirety.

Figure 7:
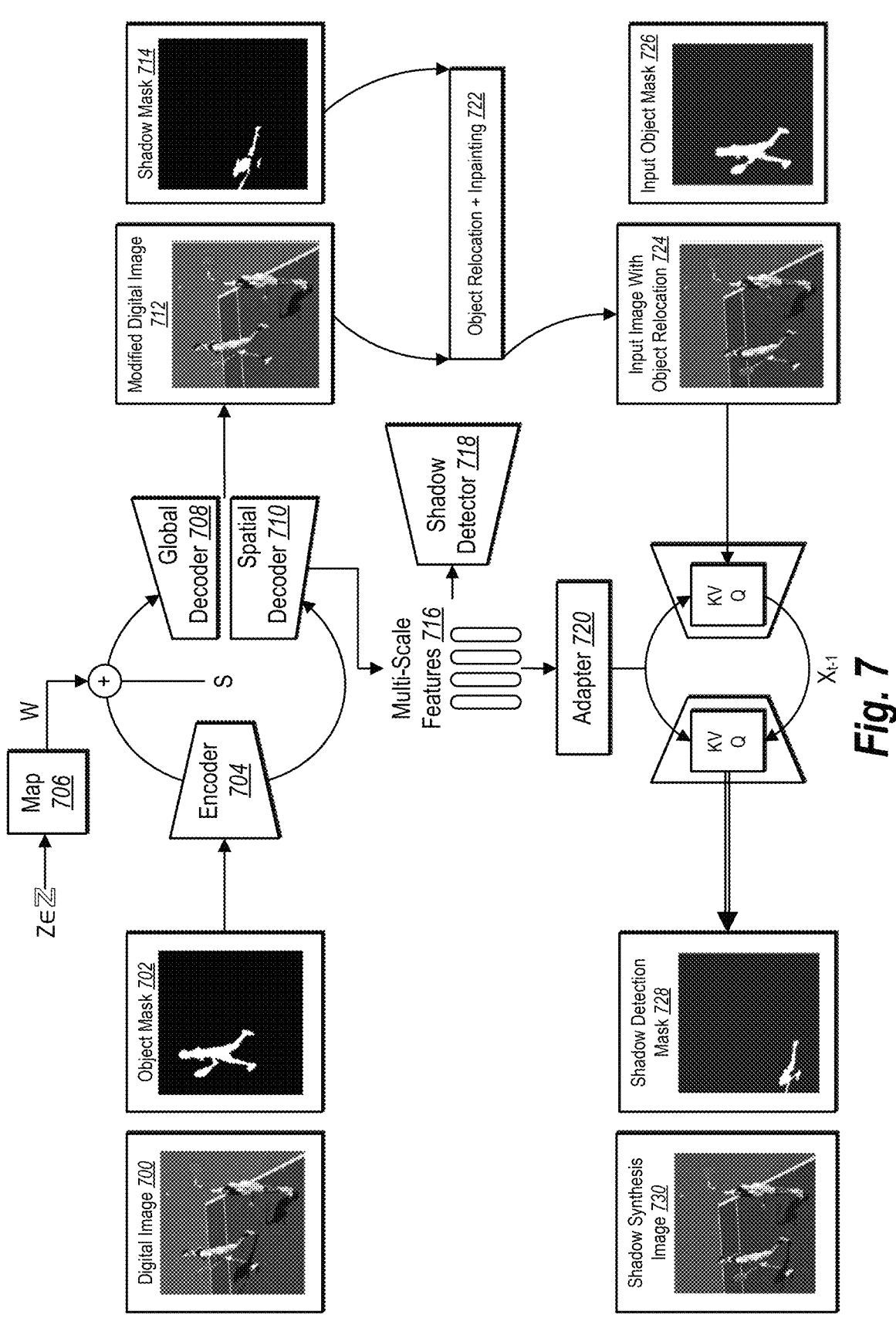
FIG. 7 illustrates an example diagram of the joint-framework of the meta-shadow system that incorporates both the shadow analyzer model and the shadow synthesis model in accordance with one or more embodiments.

As mentioned above, and as shown in the overview figure (e.g., FIG. 2), the meta-shadow system 102 incorporates the shadow detection, removal, and synthesis tasks into a unified framework. FIG. 7 illustrates a detailed overview of the joint framework for shadow detection, removal, and synthesis in accordance with one or more embodiments.

As shown in FIG. 7, the meta-shadow system 102 utilizes the shadow analyzer model (e.g., the top portion) to learn to analyze shadow information through detection and removal at an instance level (e.g., an individual object level). Specifically, from a digital image 700 ($I_{os}$) and an object mask 702 ($M_o$), the meta-shadow system 102 estimates a shadow mask 714 ($M_s$) and a modified digital image ($I_{os}$), in which the shadow of the specified object has been removed and the underlying texture restored.

To illustrate, the meta-shadow system 102 utilizes an encoder 704 to extract details from the digital image 700 and the object mask 702, and further utilizes a global decoder 708 and a spatial decoder 710 to process the extracted features (style code, global code, random noise (z) to generate a map 706) and generate the modified digital image 712. Furthermore, as shown, the meta-shadow system 102 further extracts multi-scale features 716 and utilizes a shadow detector 718 to generate the shadow mask 714.

As shown, the meta-shadow system 102 further receives performs an act 722 of receiving object relocation input and inpainting the modified digital image 712. Specifically, the meta-shadow system 102 receives an indication to relocate an object in the modified digital image 712 and in response, inpaints the modified digital image 712 responsive to the manipulation. For instance, the object relocation includes insertion of an additional object into the modified digital image 712 and/or movement of an existing object in the modified digital image 712. Accordingly, for moving an existing object, the meta-shadow system 102 performs inpainting to generate a content fill that is consistent with the rest of the modified digital image 712. FIG. 7 depicts the object relocation as moving the tennis player nearer the top down slightly. Thus, the meta-shadow system 102 inpaints the background of where the tennis player was previously.

Moreover, in response to the act 722, the meta-shadow system 102 further employs the shadow synthesis model to synthesize a shadow for the object. Specifically, the meta-shadow system 102 receives an input image with object relocation 724 and an input object mask 726 for the object being manipulated. Moreover, as shown, the meta-shadow system 102 utilizes a shadow synthesis diffusion model to process the input image with object relocation 724 and the input object mask 726 by conditioning the shadow synthesis diffusion model with the multi-scale features 716 utilizing an adapter 720.

As illustrated, the shadow synthesis diffusion model shows "K, V, and Q." "K, V, Q" refers to key, value, and query in the shadow synthesis diffusion model's cross-attention layer. In some embodiments, Q is a query variable (e.g., how much attention to pay to a token), K is a key variable (e.g., a token's content), and V is a value variable (e.g., semantic or contextual information regarding a token). Specifically, the shadow embeddings from Adapter 720 replaces K and V to inject shadow information. As further shown, the meta-shadow system 102 utilizes the shadow synthesis diffusion model to generate a shadow synthesis image 730 (e.g., depicting the new shadow) and a shadow detection mask 728.

In one or more embodiments, the meta-shadow system 102 further improves upon generating the shadow synthesis image 730 by increasing the resolution that the shadow synthesis image 730 is generated at. For instance, in some embodiments, the meta-shadow system 102 increases an output resolution from 128×128 to 256×256. Specifically, the meta-shadow system 102 upsamples a shadow region and replaces a region in a high-resolution input image with the upsampled shadow region. In some embodiments, the meta-shadow system 102 utilizes the shadow detection mask 728 solely to upsample the shadow region of a digital image in order to generate a high-resolution output of the shadow synthesis image 730.

As mentioned above, the meta-shadow system 102 trains the shadow analyzer model and the shadow synthesis model. FIG. 8 illustrates the meta-shadow system 102 utilizing specialized datasets to finetune the shadow analyzer model and the shadow synthesis model in accordance with one or more embodiments. For example, most shadow-related datasets suffer from lacking paired data for shadow removal and shadow synthesis (which is expensive to collect) leading to a scarcity of real-world datasets for models to learn from. To address such limitations, the meta-shadow system 102 utilizes tailored datasets. For instance, the meta-shadow system 102 generates a moving object with shadow dataset (MOS) that includes multiple scenes (200 scenes) each with eight camera views. Additionally, the MOS dataset further contains five object relocation cases for each scene, resulting in a total of 8000 image/ground truth pairs.

Figure 8:
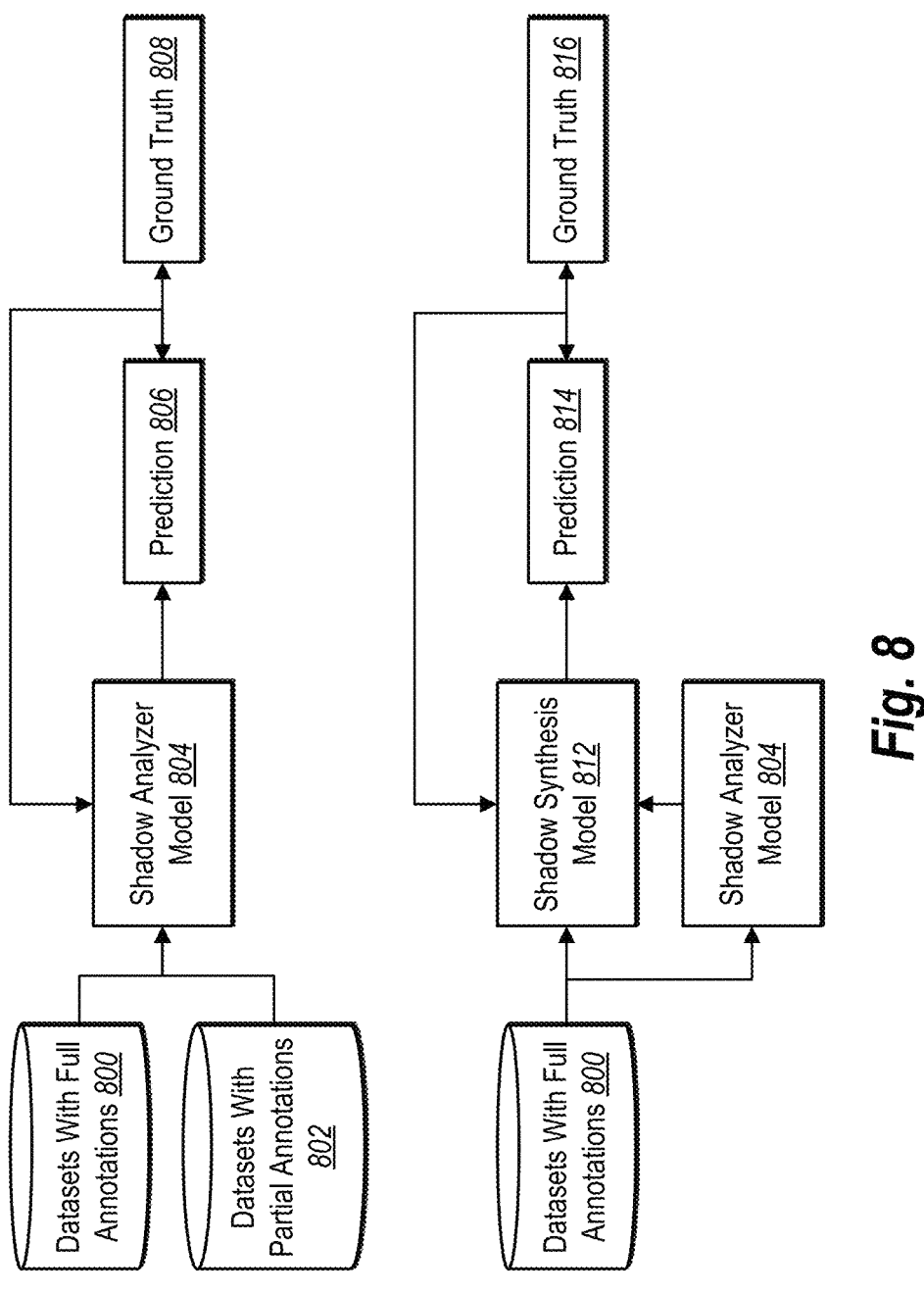
FIG. 8 illustrates an example diagram of the meta-shadow system training the shadow analyzer model and the shadow synthesis model in accordance with one or more embodiments.

As shown in FIG. 8, the meta-shadow system 102 trains a shadow analyzer model 804 utilizing datasets with full annotations 800 and datasets with partial annotations 802. Specifically, the datasets with full annotations 800 includes DESOBA, described in Yan Hong, Li Niu, and Jianfu Zhang, *Shadow generation for composite image in real-world scenes*, In AAAI Conference on Artificial Intelligence, 2022. Further, the datasets with full annotations 800 also includes the MOS dataset mentioned above that contains shadow images, object masks, shadow masks, and shadow-free images.

Further, as shown, the meta-shadow system 102 trains the shadow analyzer model 804 with datasets with partial annotations 802 that includes datasets such as ISTD+ (e.g., described in Hieu Le and Dimitris Samaras, *Shadow removal via shadow image decomposition*, In ICCV, 2019) and SRD (e.g., described in Liangqiong Qu, Jiandong Tian, Shengfeng He, Yandong Tang, and rynson W. H. Lau, *Deshadow Net: A multi-context embedding deep network for shadow removal*, In IEEE/CVF Conference on Computer Vision and Pattern Recognition, pages 4067-4075, 2017) which contain shadow images, shadow masks, and shadow-free images.

For training on the datasets with partial annotations 802, the meta-shadow system 102 trains the shadow analyzer model 804 by feeding an empty object mask and having the shadow analyzer model 804 predict general shadows and shadow masks. Further, in some embodiments, the meta-shadow system 102 randomly makes the object mask empty for datasets with full annotations 800 during training. In doing so, the meta-shadow system 102 is able to train the shadow analyzer model 804 to detect an object's shadow with a non-empty object mask and detect general cast shadows with an empty object mask.

To illustrate, the meta-shadow system 102 trains the shadow analyzer model 804 with a combination of loss measures. For instance, the meta-shadow system compares the prediction 806 and the ground truth 808 and determines adversarial loss (e.g., a loss that measures a discrepancy between the distribution of real and generated samples), perceptual loss (e.g., reconstruction loss that focuses on capturing high-level perceptual features), masked-$R_1$ regularization (e.g., an adversarial loss that penalizes a discriminator's output with respect to its input, but only for certain regions of the input space specified by a mask), and the L1 loss (e.g., mean absolute error loss). For example, the meta-shadow system 102 takes a combination of the aforementioned losses to modify parameters of the shadow analyzer model 804. Moreover, the meta-shadow system adopts dice loss (e.g., loss function to measure the dissimilarity between two probability distributions) to compute the loss between the prediction 806 and the ground truth 808.

In one or more embodiments, the meta-shadow system 102 utilizes dilated masks to supervise the shadow analyzer model 804, which enhances the shadow removal performance. Specifically, the use of dilated masks improves shadow removal because of the inherent difficulty of accurately annotating the soft edges of shadows, which limits the ability to predict seamless transitions between a shadow and de-shadowed region. As discussed above, the meta-shadow system 102 further enhances shadow removal capabilities by integrating both detection and removal outcomes, denoted as:

$$M_s = B(M_s) * (|I_{ns} - I_{os}| > t)$$

In the above notation, $B(\bullet)$ denotes the binarization operator (e.g., of the mask) and t represents a threshold value, thus, by incorporating both detection and removal, the meta-shadow system 102 more accurately removes a shadow from a digital image.

As further shown, the meta-shadow system 102 further trains a shadow synthesis model 812 with the datasets with full annotations 800 (e.g., containing the MOS dataset and the DESOBA dataset, and a Shadow-AR dataset, which is described in Daquan Liu, Chengjiang Long, Hongpan Zhang, Hanning Yu, Xinzhi Dong, and Chunxia Xiao, *ARShadowGAN: Shadow generative adversarial network for augmented reality in single light scenes*, In IEEE/CVF conference on Computer Vision and Pattern Recognition, pages 8139-8148, 2020). In some embodiments, during training, the meta-shadow system 102 randomly chooses another object as a reference when there are multiple objects in a digital image. Further, for the MOS dataset, the meta-shadow system 102 also utilizes a moved object as the reference.

As illustrated in FIG. 8, the meta-shadow system 102 generates a prediction 806 utilizing the shadow analyzer model 804 and compares the prediction 806 with a ground truth 808 to generate a measure of loss and modify parameters of the shadow analyzer model 804. Likewise, the meta-shadow system 102 generates a prediction 814 utilizing the shadow synthesis model 812 and compares the prediction 814 to a ground truth 816 to generate a measure of loss and modify parameters of the shadow synthesis model 812.

To illustrate, the meta-shadow system 102 determines a measure of loss represented as:

$$\mathcal{L} = \mathbb{E}_{t,\mathcal{E} \sim N(0,1)}\left[\| \epsilon - \epsilon_\theta(I_b', M_b, M_{\bar{s}}, t, T(F_{ms})) \|_2^2\right]$$

In the above notation, $\epsilon \sim N(0,1)$ represents an initial noise, $\epsilon_\theta$, represents the denoising U-Net (e.g., the shadow synthesis diffusion model), and $$I\frac{t}{\partial}$$

represents a noise version of $I_\partial$ at timestep t. Furthermore, $M_{\bar{s}}$ represents an optional shadow mask.

For instance, in one or more embodiments, the meta-shadow system 102 trains the shadow analyzer model with 100 epochs with a learning rate of 0.001 and a batch size of 16. The meta-shadow system 102 iterates on the fully annotated dataset ten times to balance the number of samples in a multi-dataset training approach. Moreover, the training and inference resolution are both 512×512.

In some embodiments, the meta-shadow system 102 trains a shadow synthesis model by freezing the shadow analyzer model and fine tuning a diffusion model. Specifically, the meta-shadow system 102 trains an adapter in the shadow synthesis model, where the inputs and outputs of the shadow synthesis model are all at resolution of 128×128 with a batch size of 64. Furthermore, in some embodiments, the meta-shadow system 102 employs different learning rate strategies for the diffusion model and the adapter. For instance, the learning rate for the diffusion model begins at 1e−4 and is multiplied by 0.01 after 200 epochs (400 epochs total), while the learning rate for the adapter remains constant at 1e−4 to strengthen its ability to gain shadow knowledge.

In one or more embodiments, the meta-shadow system 102 further performs shadow-specific augmentations to improve the generalizability and controllability of the joint-framework (e.g., shadow detection, removal, and synthesis). Specifically, the meta-shadow system 102 performs augmentations such as i) random shadow intensity augmentation, ii) curve-based shadow color grading, and iii) random shadow dropping. For example, random shadow intensity augmentation includes controlling the shadow intensity in images to enhance dataset diversity and model robustness. This is represented as:

$$D = (I_s - I_{sf}) * M_s,$$

$$\tilde{I}_s = I_{st} - D \times S$$

For instance, the above notation indicates computing a difference (D) between a shadow image and a shadow-free image and multiplying/combining a shadow mask with a random scale factor (S), where the scale factor ranges from [0.7, 1.3].

Further, for the curve-based shadow color grading, the meta-shadow system 102 performs this to vary lighting conditions and address photos with color adjustments. Specifically, the meta-shadow system 102 applies a three-dimensional curve to randomly adjust the color of shadow regions (e.g., set five control points ranging from 0-255 in each of three-color channels). Further, the meta-shadow system 102 randomly adds a small value (−10,10) to a second control point and retains the others at original positions to maintain a consistent higher intensity value. In doing so, the curve-based shadow color grading aids the meta-shadow system 102 in removing colored shadows. In other words, curve-based shadow color grading enables the shadow analyzer model to extract more accurate shadow information and contribute to the shadow synthesis task.

Moreover, the meta-shadow system 102 performs random shadow dropping to prevent the shadow synthesis model from ignoring the object mask and synthesizing shadows for objects without shadows. During training, training is performed with an input image without shadows, while the ground truth images have shadows. To address this, the meta-shadow system 102 performs random shadow dropping to randomly drop shadows of some objects and exclude those objects in the object mask to encourage the shadow synthesis model to be aware of the information in the object mask.

FIG. 9 illustrates an ablation study with empty or with shadow masks for synthesizing new shadows in a digital image in accordance with one or more embodiments. As mentioned above, the meta-shadow system 102 utilizes the shadow synthesis model to take a digital image (RGB) as input, an object mask, and an optional shadow mask as input.

In one or more embodiments, the shadow mask utilized for shadow synthesis is initially empty, because when an object is moved to a new location, its shadow may take on a different shape due to perspective and changes in geometry compared to its initial position. Additionally, in some embodiments, the object is inserted from another digital image and the shape of the shadow may not be known. In some embodiments, the plane in the digital image is flat and the detected shadow mask from the initial location is suitable for guiding the shadow synthesis model to synthesize a new shadow.

As shown in FIG. 9, the table illustrates training the shadow synthesis model by using an empty mask or a shadow mask. For instance, the two methods include i) the meta-shadow system 102 with an empty shadow mask and ii) the meta-shadow system 102 with a shadow mask. As indicated, the global RMSE (e.g., global root mean square error used to evaluate the accuracy of a model where the lower the value the better) is better for the meta-shadow system 102 with the shadow mask. Further, the Bbox PSNR (e.g., peak signal-to-noise ratio inside the shadow bounding box used to evaluate the quality of an image reconstruction compared to an original, where the higher the value the better) is better for the meta-shadow system 102 with the shadow mask, and the Bbox SSIM (e.g., structural similarity index inside the shadow bounding box in an image, where the higher the value the better) is also better for the meta-shadow system 102 with the shadow mask. Thus, FIG. 9 illustrates that by leveraging intermediate features from the shadow analyzer model, the shadow synthesis model more accurately generates shadows because of the shadow properties (e.g., color, intensity, shape, etc.) leveraged by the shadow synthesis model.

FIG. 10 illustrates the meta-shadow system 102 detecting shadows as compared to prior systems. As shown in FIG. 10, the table illustrates the for each of the metrics shown, the meta-shadow system 102 outperforms prior systems in detecting shadows on a SOBA test set (for intersection over union for extra small objects, small objects, medium, and large objects). The SOBA test set is described in Tianyu Wang, Xiaowei Hu, Qiong Wang, Pheng-Ann Heng, and Chi-Wing Fu, *Instance shadow detection*, In IEEE/CVF Conference on Computer Vision and Pattern Recognition.

FIG. 11 illustrates the meta-shadow system 102 synthesizing shadows as compared to prior systems in accordance with one or more embodiments. As shown in the table in FIG. 11, the meta-shadow system 102 outperforms prior systems on all metrics (masked mean absolute error, masked RMSE, bbox PSNR, Bbox SSIM, and PSNR. Thus, demonstrating the superior nature of the meta-shadow system 102 leveraging intermediate features from the shadow analyzer model in synthesizing high-quality shadows.

FIG. 12 illustrates the meta-shadow system 102 synthesizing shadows in images and digital videos compared to prior systems. Like the other figures, FIG. 12 illustrates the meta-shadow system 102 outperforms prior methods for global RMSE, local RMSE, Bbox PSNR and Bbox SSIM for both image and video shadow synthesis tasks.

FIG. 13 illustrates an ablation study on an image dataset for synthesizing shadows. For instance, FIG. 13 shows experimenters performing an ablation study to evaluate the shadow synthesis framework by considering two baseline networks (e.g., SSDM, shadow synthesis diffusion model which is the base architecture of the meta-shadow system 102 but utilizes a text embedding rather than a shadow embedding) and CLIP embeddings represents SSDM with CLIP image embeddings as conditions replacing the shadow embeddings from the multi-scale features. As shown, the table in FIG. 5 illustrates the comparison results, showing that using image embeddings is more effective than text embeddings, and furthermore, utilizing the intermediate features from the shadow analyzer model vastly improves the performance of the shadow synthesis model over previous settings.

Figure 14:
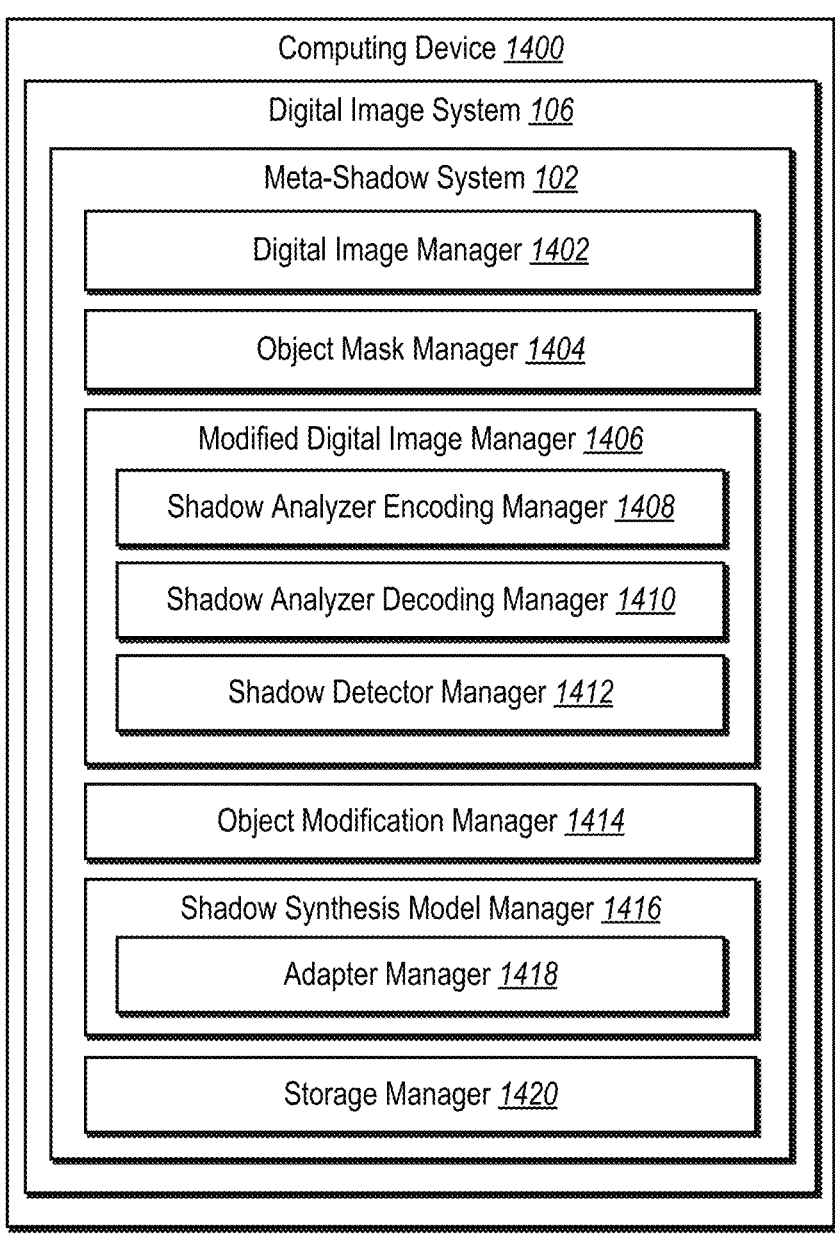
FIG. 14 illustrates a schematic diagram of the meta-shadow system in accordance with one or more implementations.

Turning to FIG. 14, additional detail will now be provided regarding various components and capabilities of the meta-shadow system 102. In particular, FIG. 14 illustrates an example schematic diagram of a computing device 1400 (e.g., the server(s) 104 and/or the client device 116) implementing the meta-shadow system 102 in accordance with one or more embodiments of the present disclosure for components 1400-1418. As illustrated in FIG. 14, the meta-shadow system 102 includes a digital image manager 1402, an object mask manager 1404, a modified digital image manager 1406, a shadow analyzer encoding manager 1408, a shadow analyzer decoding manager 1410, a shadow detector manager 1412, an object modification manager 1414, a shadow synthesis model manager 1416, an adapter manager 1418, and a storage manager 1420.

The digital image manager 1402 receives a digital image depicting a scene with objects and corresponding shadows. For example, the digital image manager 1402 accesses a digital image locally stored or stored on a cloud-based storage and provides the digital image to a client application. Further, the digital image manager 1402 provides tools at a client application for a client device to perform one or more object manipulations to the received digital image. Furthermore, the digital image manager 1402 allows a client device to indicate modifications and the digital image manager 1402 saves the modifications associated with the digital image.

The object mask manager 1404 accesses an object mask from a digital image. For example, the object mask manager 1404 communicates with the digital image manager 1402 and receives the digital image and further receives any indications of manipulations or modifications to one or more objects within the digital image. For instance, in response to receiving indications of manipulations or modifications, the object mask manager 1404 accesses an object mask for a specified object. If the object mask manager 1404 determine that there are multiple objects included within the manipulations or modifications, then the object mask manager 1404 accesses all the object masks corresponding with the manipulations or modifications.

The modified digital image manager 1406 generates a modified digital image in response to one or more modifications/manipulations. Specifically, the modified digital image manager 1406 manages the pipeline for altering a received digital image. For instance, the modified digital image manager 1406 receives the digital image, the indications of modifications/manipulations, and the accessed object mask. From the digital image and the object mask, the modified digital image manager 1406 passes these aspects to additional managers for performing the modification tasks.

The shadow analyzer encoding manager 1408 includes a portion of a shadow task pipeline, where the shadow analyzer encoding manager 1408 extracts various features. Specifically, the shadow analyzer encoding manager 1408 extracts from a combination of the digital image and the object mask, multi-scale features, global features, and spatial features. From the extracted features, the shadow analyzer encoding manager 1408 generates additional embeddings.

The shadow analyzer decoding manager 1410 processes embeddings received from the shadow analyzer encoding manager 1408. Specifically, the shadow analyzer decoding manager 1410 utilizes extracted global features and spatial features to generate the modified digital image. For instance, the shadow analyzer decoding manager 1410 references the global features and spatial features to inpaint a portion of the digital image corresponding to a shadow to remove the shadow from the digital image and replace it with pixels that is globally and locally consistent with the rest of the digital image.

The shadow detector manager 1412 manages a shadow detector integrated with a global-spatial decoder of the shadow analyzer model. Specifically, the shadow detector manager 1412 receives multi-scale features from the spatial decoder of the global-spatial decoder, and from the multi-scale features, the shadow detector manager 1412 generates a shadow prediction. For instance, the shadow detector manager 1412 generates a shadow mask of the shadow utilizing the multi-scale features. From extracting the multi-scale features, the shadow detector manager 1412 further collaborates with the shadow synthesis model to aid in shadow synthesis.

The object modification manager 1414 receives one or more user interactions to modify an object. Specifically, the object modification manager 1414 receives object manipulation inputs such as an indication to move an existing object to another spot in the digital image or to insert a digital image from a digital image into another digital image. For instance, the object modification manager 1414 receives the user interactions to modify an object, and in response, accesses one or more objects corresponding to the user interactions.

The shadow synthesis model manager 1416 manages the generation of a new shadow in a digital image. Specifically, the shadow synthesis model manager 1416 combines an object mask of an object (e.g., indicated from a user interaction), and a digital image to create a combined representation. Further, the shadow synthesis model manager 1416 receives a shadow mask of the object from the shadow analyzer model. Additionally, the shadow synthesis model manager 1416 generates a new shadow for the object by conditioning different layers of a shadow synthesis diffusion model with the shadow mask of the object to generate a modified digital image that includes the new shadow.

The adapter manager 1418 further collaborates with the shadow synthesis model manager 1416 to leverage intermediate features (e.g., the shadow mask) from the shadow analyzer model. Specifically, the adapter manager 1418 receives multi-scale features from the shadow analyzer model and adapts the multi-scale features to be compatible with conditioning layers of the shadow synthesis diffusion model. In doing so, the adapter manager 1418 aids the shadow synthesis model manager 1416 to more accurately synthesize shadows.

The storage manager 1420 stores various components discussed in FIG. 14. For example, the storage manager 1420 stores the shadow analyzer model, the shadow synthesis model, digital images, object masks, modified digital images, multi-scale features, global features, spatial features, user interactions to modify an object, combined representations, shadow mask predictions, and newly synthesized shadows. Additionally, the storage manager 1420 also stores training components such as a training dataset (e.g., fully annotated, and partially annotated).

Each of the components 1402-1420 of the meta-shadow system 102 includes software, hardware, or both. For example, the components 1402-1420 includes one or more instructions stored on a computer-readable storage medium and executable by processors of one or more computing devices, such as a client device or server device. When executed by the one or more processors, the computer-executable instructions of the meta-shadow system 102 can cause the computing device(s) to perform the methods described herein. Alternatively, the components 1402-1420 includes hardware, such as a special-purpose processing device to perform a certain function or group of functions. Alternatively, the components 1402-1420 of the meta-shadow system 102 includes a combination of computer-executable instructions and hardware.

Furthermore, the components 1402-1420 of the meta-shadow system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1402-1420 of the meta-shadow system 102 may be implemented as a stand-alone application, such as a desktop or mobile application. Furthermore, the components 1402-1420 of the meta-shadow system 102 may be implemented as one or more web-based applications hosted on a remote server. Alternatively, or additionally, the components 1402-1420 of the meta-shadow system 102 may be implemented in a suite of mobile device applications or "apps." For example, in one or more embodiments, the meta-shadow system 102 comprises or operates in connection with digital software applications such as ADOBE® PHOTOSHOP, ADOBE® EXPRESS, ADOBE® PHOTOSHOP LIGHTROOM, and/or ADOBE® AFTER EFFECTS.

FIGS. 1-14, the corresponding text, and the examples provide a number of different methods, systems, devices, and non-transitory computer-readable media of the 1402-1402. In addition to the foregoing, one or more embodiments can also be described in terms of flowcharts comprising acts for accomplishing the particular result, as shown in FIG. 15. FIG. 15 may be performed with more or fewer acts. Further, the acts may be performed in different orders. Additionally, the acts described herein may be repeated or performed in parallel with one another or in parallel with different instances of the same or similar acts.

FIG. 15 illustrates a flowchart of a series of acts 1500 for generating a shadow mask in accordance with one or more embodiments. FIG. 15 illustrates acts according to one embodiment, alternative embodiments may omit, add to, reorder, and/or modify any of the acts shown in FIG. 15. In some implementations, the acts of FIG. 15 are performed as part of a method. For example, in some embodiments, the acts of FIG. 15 are performed as part of a computer-implemented method. Alternatively, a non-transitory computer-readable medium can store instructions thereon that, when executed by at least one processor, cause a computing device to perform the acts of FIG. 15. In some embodiments, a system performs the acts of FIG. 15. For example, in one or more embodiments, a system includes at least one memory device. The system further includes at least one server device configured to cause the system to perform the acts of FIG. 15.

The series of acts 1500 includes an act 1502 of receiving a digital image depicting a scene with an object. Moreover, the act 1500 includes an act 1504 of accessing an object mask of the object. Further, the series of acts 1500 includes an act 1506 of generating a modified digital image. Moreover, the act 1506 includes a sub-act 1506*a* of extracting multi-scale features, global features, and spatial features. Further, the act 1506 includes a sub-act 1506*b* of generating the modified digital image without the shadow of the object. Moreover, the series of acts 1500 includes an act 1508 of generating, from the multi-scale features, a shadow mask of the shadow.

In particular, the act 1502 includes receiving a digital image depicting a scene comprising an object and a shadow of the object. Further, the act 1504 includes accessing an object mask of the object in the digital image. Moreover, the act 1506 with the sub-act 1506*a* includes generating a modified digital image by extracting, from a combination of the digital image and the object mask, utilizing an encoder of a shadow analyzer model, multi-scale features, global features, and spatial features. Additionally, the sub-act 1506*b* includes generating, from the global features and the spatial features, utilizing a global-spatial decoder, the modified digital image without the shadow of the object. Further, the act 1508 includes generating, from the multi-scale features, utilizing a shadow detector, a shadow mask of the shadow.

For example, in one or more embodiments, the series of acts 1500 includes receiving, via a user interaction with the digital image an indication to remove the shadow of the object. In addition, in one or more embodiments, the series of acts 1500 includes generating a fill corresponding to the removed shadow of the object that is consistent with the digital image based on the global features and the spatial features. Further, in one or more embodiments, the series of acts 1500 includes receiving lighting data and geometry of the scene to generate pixels for the shadow removed from digital image that is globally and locally consistent with a remainder of the modified digital image.

Further, in some embodiments, the series of acts 1500 includes generating, utilizing a generative inpainting neural network of the shadow analyzer model, pixel values consistent with the scene and without the shadow by modulating the generative inpainting neural network based on the object mask of the object. Moreover, in some embodiments, the series of acts 1500 includes utilizing a shadow detector integrated with the global-spatial decoder to identify a shadow region of the digital image by upsampling multi-scale features to a uniform size. Further, in some embodiments, the series of acts 1500 includes combining the uniform size of the upsampled multi-scale features to a feature map to generate the shadow mask of the shadow.

Moreover, in one or more embodiments, the series of acts 1500 includes receiving an additional digital image with a plurality of objects and a plurality of shadows corresponding to the plurality of objects. Further, in one or more embodiments, the series of acts 1500 includes accessing an empty mask for the additional digital image. Moreover, in one or more embodiments, the series of acts 1500 includes in response to receiving the empty mask, removing the plurality of shadows corresponding to the plurality of objects in the additional digital image. Further, in one or more embodiments, the series of acts 1500 includes receiving an additional digital image comprising an additional shadow cast from an additional object outside of a frame of the additional digital image.

Moreover, in one or more embodiments, the series of acts 1500 includes accessing an empty mask in response to identifying that the additional shadow is cast from the additional object outside of the frame. Additionally, in one or more embodiments, the series of acts 1500 includes in response to the empty mask, removing the additional shadow from the additional digital image.

FIG. 16 illustrates a flowchart of a series of acts 1600 for generating a modified digital image in accordance with one or more embodiments. FIG. 16 illustrates acts according to one embodiment, alternative embodiments may omit, add to, reorder, and/or modify any of the acts shown in FIG. 16. In some implementations, the acts of FIG. 16 are performed as part of a method. For example, in some embodiments, the acts of FIG. 16 are performed as part of a computer-implemented method. Alternatively, a non-transitory computer-readable medium can store instructions thereon that, when executed by at least one processor, cause a computing device to perform the acts of FIG. 16. In some embodiments, a system performs the acts of FIG. 16. For example, in one or more embodiments, a system includes at least one memory device. The system further includes at least one server device configured to cause the system to perform the acts of FIG. 16.

The series of acts 1600 includes an act 1602 of in response to receiving a user interaction, accessing an object mask of the object. Moreover, the act 1600 includes an act 1604 of combining the object mask of the object and the digital image. Further, the series of acts 1600 includes an optional act 1606 of receiving a shadow mask of the object. Moreover, the series of acts 1600 includes an act 1608 of generating a new shadow for the object by conditioning a shadow synthesis diffusion model with the shadow mask of the object received from the shadow analyzer model. Additionally, the series of acts 1600 includes an act 1610 of generating a modified digital image that includes the new shadow.

In particular, the act 1602 includes in response to receiving a user interaction to modify an object depicted in a digital image, accessing an object mask of the object. Further, the act 1604 includes combining the object mask of the object and the digital image to generate a combined representation. Moreover, the act 1606 includes receiving, from a shadow analyzer model, a shadow mask of the object. Further, the act 1608 includes generating, from the combined representation and utilizing a shadow synthesis diffusion model, a new shadow for the object by conditioning a shadow synthesis diffusion model with the shadow mask of the object received from the shadow analyzer model. Moreover, the act 1610 includes generating a modified digital image that includes the object with the new shadow.

For example, in one or more embodiments, the series of acts 1600 includes receiving the user interaction to modify the object comprises relocating the object by moving the object in the digital image from a first location in the digital image to a second location in the digital image. In addition, in one or more embodiments, the series of acts 1600 includes combining the object mask of the object and the digital image comprises combining the object mask and the digital image depicting the object moved to the second location to generate the combined representation. Further, in one or more embodiments, the series of acts 1600 includes receiving the user interaction to modify the object comprises relocating the object by adding the object to a location of the digital image, the object coming from an additional digital image. Further, in some embodiments, the series of acts 1600 includes combining the object mask of the object and the digital image comprises combining the object mask and the digital image depicting the added object in the location to generate the combined representation.

Moreover, in some embodiments, the series of acts 1600 includes accessing, from the shadow analyzer model, shadow property data comprising intensity, softness, color, and direction of a shadow corresponding to the shadow mask of the object. Furthermore, in one or more embodiments, the series of acts 1600 includes combining the shadow property data to generate a feature map of the shadow mask. Moreover, in one or more embodiments, the series of acts 1600 includes resizing the feature map of the shadow mask from a first size to a second size, the second size being smaller than the first size.

Moreover, in one or more embodiments, the series of acts 1600 includes utilizing an adapter of the shadow synthesis diffusion model to align the resized feature map with text tokens. Further, in one or more embodiments, the series of acts 1600 includes utilizing a cross-attention mechanism of the shadow synthesis diffusion model to condition an iterative denoising process of the shadow synthesis diffusion model with the resized feature map aligned with the text tokens.

Moreover, in one or more embodiments, the series of acts 1600 includes generating, at a first denoising process of the shadow synthesis diffusion model, a first additional shadow mask of the object based on conditioning the first denoising process with the shadow mask of the object. Further, in one or more embodiments, the series of acts 1600 includes generating, at a second denoising process of the shadow synthesis diffusion model, a second additional shadow mask of the object based on conditioning the second denoising process with the shadow mask of the object. Moreover, in some embodiments, the series of acts 1600 includes generating the new shadow for the object based on the first additional shadow mask and the second additional shadow mask.

FIG. 17 illustrates a flowchart of a series of acts 1700 for generating a modified shadow for an object in accordance with one or more embodiments. FIG. 17 illustrates acts according to one embodiment, alternative embodiments may omit, add to, reorder, and/or modify any of the acts shown in FIG. 17. In some implementations, the acts of FIG. 17 are performed as part of a method. For example, in some embodiments, the acts of FIG. 17 are performed as part of a computer-implemented method. Alternatively, a non-transitory computer-readable medium can store instructions thereon that, when executed by at least one processor, cause a computing device to perform the acts of FIG. 17. In some embodiments, a system performs the acts of FIG. 17. For example, in one or more embodiments, a system includes at least one memory device. The system further includes at least one server device configured to cause the system to perform the acts of FIG. 17.

The series of acts 1700 includes an act 1702 of accessing an object mask of an object and a digital image. Moreover, the act 1700 includes an act 1704 of performing object-centered shadow detection and removal to generate a modified digital image. Further, the series of acts 1700 includes an act 1706 of in response to receiving a user interaction to manipulate the object, combining the object mask of the object and the modified digital image. Moreover, the series of acts 1700 includes an act 1708 of generating, from the combined representation and utilizing a shadow synthesis diffusion model, a modified shadow of the object.

In particular, the act 1702 includes accessing an object mask of an object and a digital image depicting a scene depicting the object and a shadow of the object. Further, the act 1704 includes performing object-centered shadow detection and removal to generate a modified digital image without the shadow of the object by extracting, via an encoder of a shadow analyzer model, features from a combination of the digital image and the object mask. Moreover, the act 1706 includes in response to receiving a user interaction to manipulate the object, combining the object mask of the object and the modified digital image to generate a combined representation. Further, the act 1708 includes generating, from the combined representation and utilizing a shadow synthesis diffusion model, a modified shadow for the object responsive to the user interaction by conditioning the shadow synthesis diffusion model with a shadow mask of the object generated by the shadow analyzer model.

Further, in some embodiments, the series of acts 1700 includes extracting the features from the combination of the digital image and the object mask by utilizing an encoder of the shadow analyzer model to extract multi-scale features, global features, and spatial features. Moreover, in some embodiments, the series of acts 1700 includes generating, utilizing a shadow detector of the shadow analyzer model, the shadow mask of the object from the multi-scale features.

Furthermore, in one or more embodiments, the series of acts 1700 includes moving the object in the digital image from a first location in the digital image to a second location in the digital image. Moreover, in one or more embodiments, the series of acts 1700 includes adding the object to a location in an additional digital image.

For example, in one or more embodiments, the series of acts 1700 includes accessing shadow property data comprising intensity, softness, color, and direction of a shadow corresponding to the shadow of the object to generate a feature map of the shadow. In addition, in one or more embodiments, the series of acts 1700 includes aligning the feature map with text tokens by utilizing an adapter of the shadow synthesis diffusion model to generate shadow embeddings of the shadow mask. Further, in one or more embodiments, the series of acts 1700 includes conditioning the shadow synthesis diffusion model with the shadow embeddings of the shadow. Further, in some embodiments, the series of acts 1700 includes adding an additional object to the modified digital image, wherein the additional object comes from an additional digital image without a corresponding shadow. Moreover, in some embodiments, the series of acts 1700 includes accessing the modified shadow as a reference shadow to generate a new shadow for the additional object.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 18:
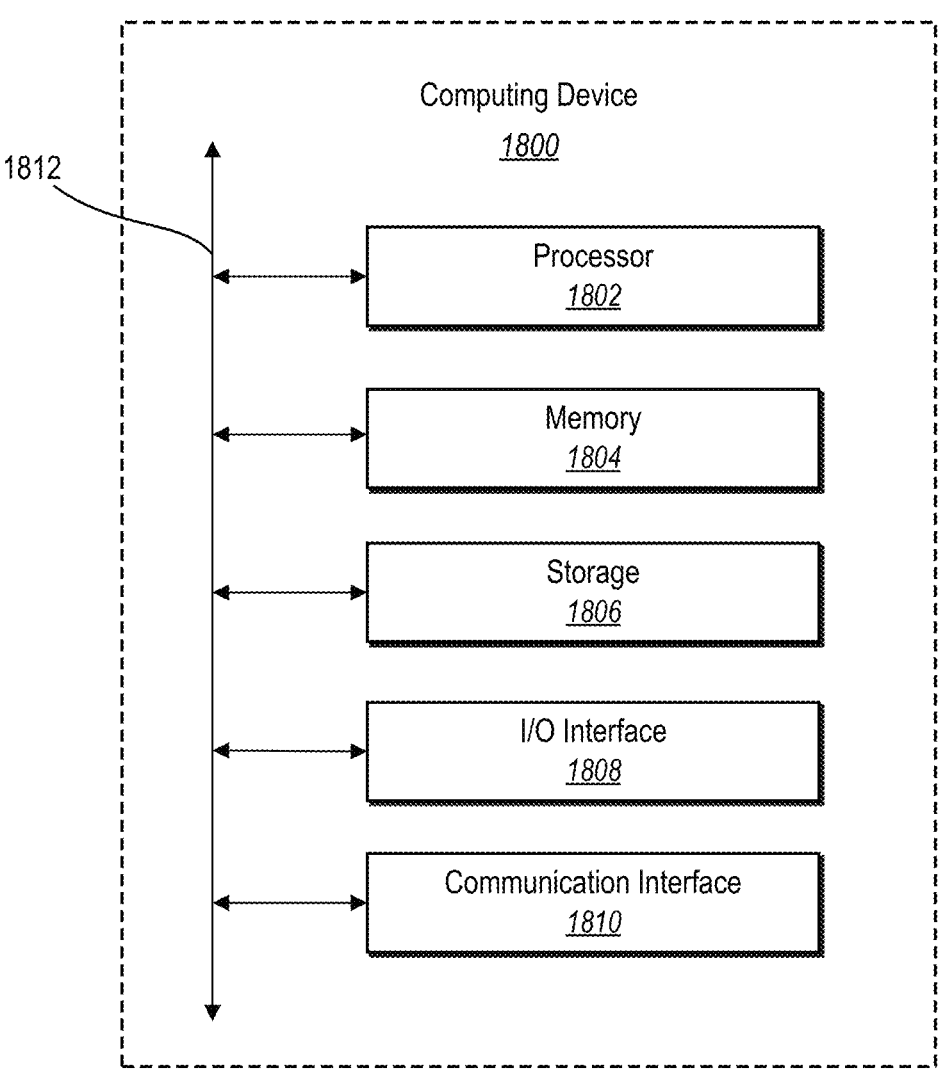
FIG. 18 illustrates a block diagram of an exemplary computing device in accordance with one or more implementations.

FIG. 18 illustrates a block diagram of an example computing device 1800 that may be configured to perform one or more of the processes described above. One will appreciate that one or more computing devices, such as the computing device 1800 may represent the computing devices described above (e.g., the server(s) 104 and/or the client device 116). In one or more embodiments, the computing device 1800 may be a mobile device (e.g., a mobile telephone, a smartphone, a PDA, a tablet, a laptop, a camera, a tracker, a watch, a wearable device). In some embodiments, the computing device 1800 may be a non-mobile device (e.g., a desktop computer or another type of client device). Further, the computing device 1800 may be a server device that includes cloud-based processing and storage capabilities.

As shown in FIG. 18, the computing device 1800 can include one or more processor(s) 1802, memory 1804, a storage device 1806, input/output interfaces 1808 (or "I/O interfaces 1808"), and a communication interface 1810, which may be communicatively coupled by way of a communication infrastructure (e.g., bus 1812). While the computing device 1800 is shown in FIG. 18, the components illustrated in FIG. 18 are not intended to be limiting. Additional or alternative components may be used in other embodiments. Furthermore, in certain embodiments, the computing device 1800 includes fewer components than those shown in FIG. 18. Components of the computing device 1800 shown in FIG. 18 will now be described in additional detail.

In particular embodiments, the processor(s) 1802 include hardware for executing instructions, such as those making up a computer program. As an example, and not by way of limitation, to execute instructions, the processor(s) 1802 may retrieve (or fetch) the instructions from an internal register, an internal cache, memory 1804, or a storage device 1806 and decode and execute them.

The computing device 1800 includes memory 1804, which is coupled to the processor(s) 1802. The memory 1804 may be used for storing data, metadata, and programs for execution by the processor(s). The memory 1804 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1804 may be internal or distributed memory.

The computing device 1800 includes a storage device 1806 including storage for storing data or instructions. As an example, and not by way of limitation, the storage device 1806 can include a non-transitory storage medium described above. The storage device 1806 may include a hard disk drive (HDD), flash memory, a Universal Serial Bus (USB) drive or a combination these or other storage devices.

As shown, the computing device 1800 includes one or more I/O interfaces 1808, which are provided to allow a user to provide input to (such as user strokes), receive output from, and otherwise transfer data to and from the computing device 1800. These I/O interfaces 1808 may include a mouse, keypad or a keyboard, a touch screen, camera, optical scanner, network interface, modem, other known I/O devices or a combination of such I/O interfaces 1808. The touch screen may be activated with a stylus or a finger.

The I/O interfaces 1808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1808 are configured to provide graphical data to a display for presentation to a user. The graphical data may be representative of one or more graphical user interfaces and/or any other graphical content as may serve a particular implementation.

The computing device 1800 can further include a communication interface 1810. The communication interface 1810 can include hardware, software, or both. The communication interface 1810 provides one or more interfaces for communication (such as, for example, packet-based communication) between the computing device and one or more other computing devices or one or more networks. As an example, and not by way of limitation, communication interface 1810 may include a network interface controller (NIC) or network adapter for communicating with an Ethernet or other wire-based network or a wireless NIC (WNIC) or wireless adapter for communicating with a wireless network, such as a WI-FI. The computing device 1800 can further include a bus 1812. The bus 1812 can include hardware, software, or both that connects components of computing device 1800 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed:

1. A computer-implemented method comprising:
receiving a digital image depicting a scene comprising an object and a shadow of the object;
accessing an object mask of the object in the digital image; and
generating a modified digital image by:
extracting, from a combination of the digital image and the object mask, utilizing an encoder of a shadow analyzer model, multi-scale features, global features, and spatial features;

generating, from the global features and the spatial features, utilizing a global-spatial decoder, the modified digital image without the shadow of the object; and generating, from the multi-scale features from a spatial decoder of the global-spatial decoder, utilizing a shadow detector, a shadow mask of the shadow.

2. The computer-implemented method of claim 1, wherein generating the modified digital image comprises:

receiving, via a user interaction with the digital image an indication to remove the shadow of the object; and generating a fill corresponding to the removed shadow of the object that is consistent with the digital image based on the global features and the spatial features.

3. The computer-implemented method of claim 1, wherein accessing the object mask further comprises receiving lighting data and geometry of the scene to generate pixels for the shadow removed from digital image that is globally and locally consistent with a remainder of the modified digital image.

4. The computer-implemented method of claim 1, wherein generating the modified digital image without the shadow of the object comprises generating, utilizing a generative inpainting neural network of the shadow analyzer model, pixel values consistent with the scene and without the shadow by modulating the generative inpainting neural network based on the object mask of the object.

5. The computer-implemented method of claim 1, wherein generating the shadow mask of the shadow comprises:

utilizing a shadow detector integrated with the global-spatial decoder to identify a shadow region of the digital image by upsampling multi-scale features to a uniform size; and combining the uniform size of the upsampled multi-scale features to a feature map to generate the shadow mask of the shadow.

6. The computer-implemented method of claim 1, further comprising:

receiving an additional digital image with a plurality of objects and a plurality of shadows corresponding to the plurality of objects; and accessing an empty mask for the additional digital image.

7. The computer-implemented method of claim 6, further comprising in response to receiving the empty mask, removing the plurality of shadows corresponding to the plurality of objects in the additional digital image.

8. The computer-implemented method of claim 1, further comprising:

receiving an additional digital image comprising an additional shadow cast from an additional object outside of a frame of the additional digital image;

accessing an empty mask in response to identifying that the additional shadow is cast from the additional object outside of the frame; and in response to the empty mask, removing the additional shadow from the additional digital image.

9. A non-transitory computer-readable medium storing instructions thereon that, when executed by at least one processor, cause the at least one processor to perform operations comprising:

in response to receiving a user interaction to modify an object depicted in a digital image, accessing an object mask of the object;

combining the object mask of the object and the digital image to generate a combined representation;

receiving, from a shadow analyzer model, a shadow mask of the object;

generating, from the combined representation and utilizing a shadow synthesis diffusion model, a new shadow for the object by conditioning the shadow synthesis diffusion model with the shadow mask of the object received from the shadow analyzer model; and generating a modified digital image that includes the object with the new shadow.

10. The non-transitory computer-readable medium of claim 9, wherein:

receiving the user interaction to modify the object comprises relocating the object by moving the object in the digital image from a first location in the digital image to a second location in the digital image; and combining the object mask of the object and the digital image comprises combining the object mask and the digital image depicting the object moved to the second location to generate the combined representation.

11. The non-transitory computer-readable medium of claim 9, wherein:

receiving the user interaction to modify the object comprises relocating the object by adding the object to a location of the digital image, the object coming from an additional digital image; and combining the object mask of the object and the digital image comprises combining the object mask and the digital image depicting the added object in the location to generate the combined representation.

12. The non-transitory computer-readable medium of claim 9, further comprising:

accessing, from the shadow analyzer model, shadow property data comprising intensity, softness, color, and direction of a shadow corresponding to the shadow mask of the object; and combining the shadow property data to generate a feature map of the shadow mask.

13. The non-transitory computer-readable medium of claim 12, wherein the operations further comprise resizing the feature map of the shadow mask from a first size to a second size, the second size being smaller than the first size.

14. The non-transitory computer-readable medium of claim 13, wherein conditioning the shadow synthesis diffusion model with the shadow mask of the object comprises:

utilizing an adapter of the shadow synthesis diffusion model to align the resized feature map with text tokens; and utilizing a cross-attention mechanism of the shadow synthesis diffusion model to condition an iterative denoising process of the shadow synthesis diffusion model with the resized feature map aligned with the text tokens.

15. The non-transitory computer-readable medium of claim 9, wherein generating the new shadow for the object comprises:

generating, at a first denoising process of the shadow synthesis diffusion model, a first additional shadow mask of the object based on conditioning the first denoising process with the shadow mask of the object;

generating, at a second denoising process of the shadow synthesis diffusion model, a second additional shadow mask of the object based on conditioning the second denoising process with the shadow mask of the object; and generating the new shadow for the object based on the first additional shadow mask and the second additional shadow mask.

16. A system comprising:

one or more memory devices; and one or more processors coupled to the one or more memory devices that cause the system to perform operations comprising:

accessing an object mask of an object and a digital image depicting a scene depicting the object and a shadow of the object;

performing object-centered shadow detection and object-centered removal to generate a modified digital image without the shadow of the object by extracting, via an encoder of a shadow analyzer model, features from a combination of the digital image and the object mask;

in response to receiving a user interaction to manipulate the object, combining the object mask of the object and the modified digital image to generate a combined representation; and generating, from the combined representation and utilizing a shadow synthesis diffusion model, a modified shadow for the object responsive to the user interaction by conditioning the shadow synthesis diffusion model with a shadow mask of the object generated by the shadow analyzer model.

17. The system of claim 16, wherein the operations further comprise:

extracting the features from the combination of the digital image and the object mask by utilizing an encoder of the shadow analyzer model to extract multi-scale features, global features, and spatial features; and generating, utilizing a shadow detector of the shadow analyzer model, the shadow mask of the object from the multi-scale features.

18. The system of claim 16, wherein receiving the user interaction to manipulate the object comprises:

moving the object in the digital image from a first location in the digital image to a second location in the digital image; or adding the object to a location in an additional digital image.

19. The system of claim 16, wherein conditioning the shadow synthesis diffusion model with the shadow mask of the object comprises:

accessing shadow property data comprising intensity, softness, color, and direction of a shadow corresponding to the shadow of the object to generate a feature map of the shadow;

aligning the feature map with text tokens by utilizing an adapter of the shadow synthesis diffusion model to generate shadow embeddings of the shadow mask; and conditioning the shadow synthesis diffusion model with the shadow embeddings of the shadow.

20. The system of claim 16, wherein the operations further comprise:

adding an additional object to the modified digital image, wherein the additional object comes from an additional digital image without a corresponding shadow; and accessing the modified shadow as a reference shadow to generate a new shadow for the additional object.

\* \* \* \* \*